(12) United States Patent
Parris et al.

(10) Patent No.: US 7,880,641 B2
(45) Date of Patent: Feb. 1, 2011

(54) CONFIGURABLE SMART UTILITY METER BOX

(76) Inventors: Earl H. Parris, 31 N. Washington St., Summerville, GA (US) 30747; John Michael Kay, 1947 Old River Rd., Rome, GA (US) 30165

( * ) Notice: Subject to any disclaimer, the term of this patent is extended or adjusted under 35 U.S.C. 154(b) by 1073 days.

(21) Appl. No.: 11/614,648

(22) Filed: Dec. 21, 2006

(65) Prior Publication Data
US 2008/0150750 A1 Jun. 26, 2008

(51) Int. Cl.
*G01F 15/06* (2006.01)
(52) U.S. Cl. ............... 340/870.02; 340/870.07; 137/625.11; 700/282; 709/201; 73/195
(58) Field of Classification Search ............ 340/870.02, 340/870.07; 137/625.11, 487.5; 73/40, 195; 700/282; 709/201
See application file for complete search history.

(56) References Cited

U.S. PATENT DOCUMENTS

| | | | |
|---|---|---|---|
| 3,961,528 A | | 6/1976 | Ford |
| 4,516,794 A * | | 5/1985 | Zorb et al. ................ 285/30 |
| 4,669,305 A | | 6/1987 | Rivero-Olmedo |
| 5,148,828 A | | 9/1992 | Farnham |
| 5,559,289 A | | 9/1996 | Brunson, IV et al. |
| 5,823,577 A | | 10/1998 | Johnston |
| 6,460,567 B1 | | 10/2002 | Hansen, III et al. |
| 6,851,567 B2 | | 2/2005 | McKinnon |
| 6,853,309 B1 * | | 2/2005 | Schroter ............ 340/870.02 |
| 6,913,203 B2 | | 7/2005 | Delangis |
| 7,059,340 B2 | | 6/2006 | Hecking |
| 7,549,439 B2 * | | 6/2009 | Kimura et al. ........ 137/487.5 |
| 2003/0197617 A1 * | | 10/2003 | Berger et al. .......... 340/605 |
| 2004/0078350 A1 * | | 4/2004 | Hattori ............... 705/412 |
| 2006/0059977 A1 * | | 3/2006 | Kates ................... 73/40 |
| 2006/0103546 A1 * | | 5/2006 | Salser et al. ......... 340/870.02 |
| 2006/0114121 A1 * | | 6/2006 | Cumeralto et al. ..... 340/870.02 |
| 2008/0290986 A1 * | | 11/2008 | Laughlin-Parker et al. ... 340/3.8 |
| 2009/0058088 A1 * | | 3/2009 | Pitchford et al. .......... 290/50 |

OTHER PUBLICATIONS

Innovative Components, Pressure Transducer—PT—1000, (Date Unknown)—(1 Page).

MIT Department of Civil and Environmental Engineering, Wireless sensors connect underground pipes to networks, (Date Unknown)—(8 Pages).

(Continued)

*Primary Examiner*—Timothy Edwards, Jr.
(74) *Attorney, Agent, or Firm*—Monty Simmons; Simmons Patents

(57) ABSTRACT

The invention relates to a meter box for housing a utility meter and configured for associating a customer service line to a utility service line. The meter box may be configured to fit within an existing meter box and may be configured with side sections in a telescopic arrangement. Flow control components at an input of the meter box prevent backflow.

The meter box comprises an electronic module that includes a variety of selectable features including datalogging, AMR, environmental monitoring, and resource monitoring. A remote monitor is provided for allowing a customer to view selected data including consumption data, pressure, pH, temperature, warnings, remote turnoff, and provide secured bill paying services. Imaging/audio components provide visual and audio data which may include an image of an analog readout for a meter register, images of the metering environment, and sound data for metering environment.

16 Claims, 21 Drawing Sheets

OTHER PUBLICATIONS

Keller, "Capacitive Pressure Transmitter", Series 41X, (Date Unknown)—(2 Pages).
Backpacker's Den, "How To Use Trioxane", http://jlum.tripod.com/backpack/trioxane.htm (Date Unknown)—(2 Pages).
Sutron, Mulit-Parameter Water Quality Probe 5600-0703, (Date Unknown)—(1 page).
Rosemount, Free Chlorine Sensor, Product Data Sheet PDS 71-499ACL01/rev.C (Aug. 2004)—(6 Pages).
Sixth Sense, Operating Toxic Gas Cells, (Date Unknown)—(9 Pages).
MPI Outdorrs, Advertisement for Esbit tablets, http://www.mpioutdoors.com/esbit.htm, (Date Unknown)—(4 Pages).
The Ford Meter Box Co., Inc., Ford Meter Boxes, Section C, (Oct. 2002)—(52 Pages).
Rosemount Analytical Inc., "Product Data Sheet 71-450/rev.A", Free Residual Chlorine Sensor, Model 450 PDS, (Feb. 1996)—(4 Pages).
Shane Smith, "What's New With Values", http://www.igin.com/Irrigation/whatsnew.html—(Date Unknown)—(5 pages).
Sixth Sense, Micro Sensor—C12, (Date Unknown)—(2 pages).
U.S. EPA, "pH in Drinking Water" Secondary Drinking Water Standards, www.epa.gov/safewater/consumer/2ndstandards.html, (Jul. 2004)—(2 pages).
Carson Industries, LLC, PolyPlastic 1015 Standard Meter Box, (Date Unknown)—(2 Pages).

* cited by examiner

TOP VIEW

Prior Art

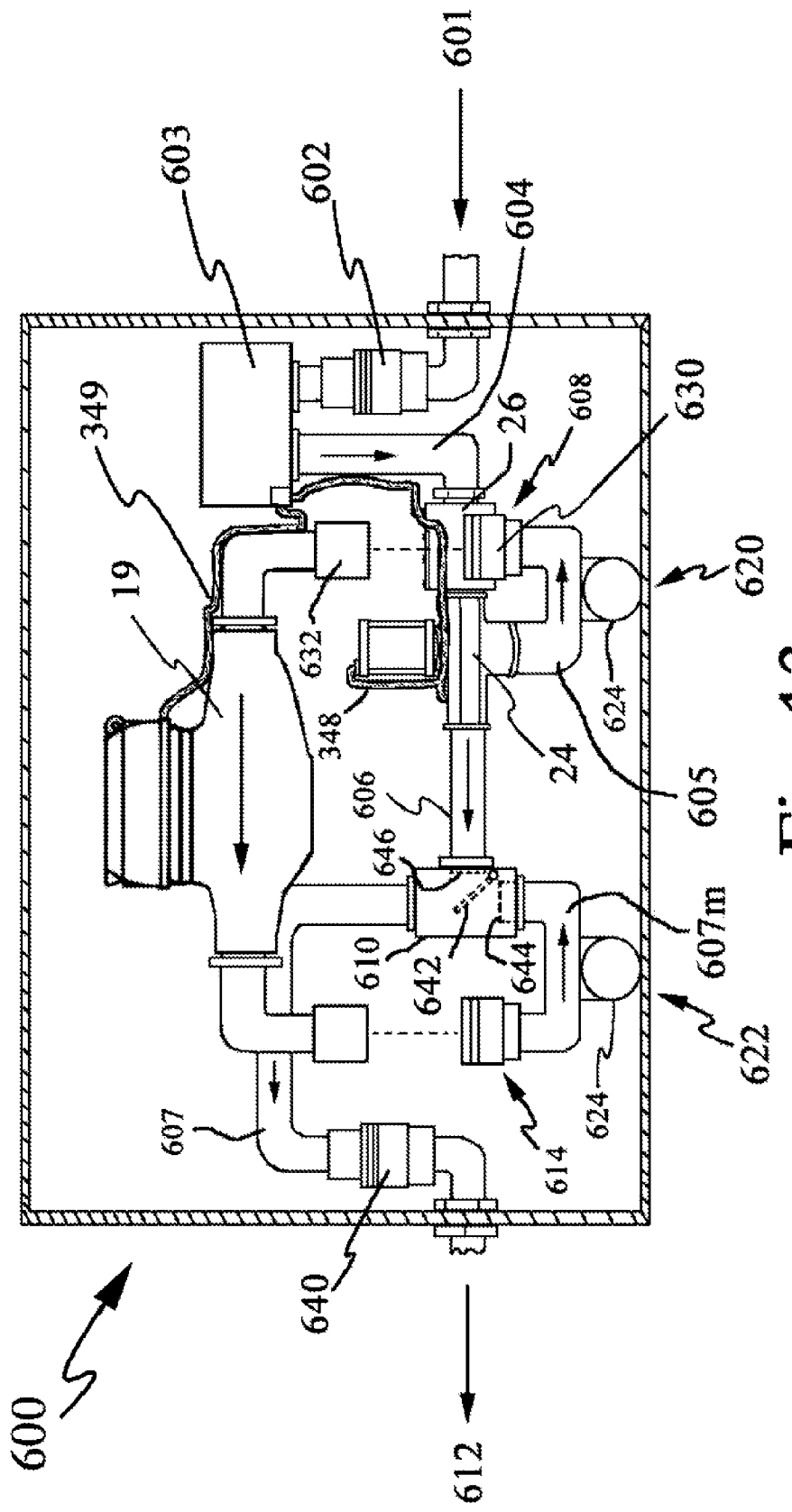

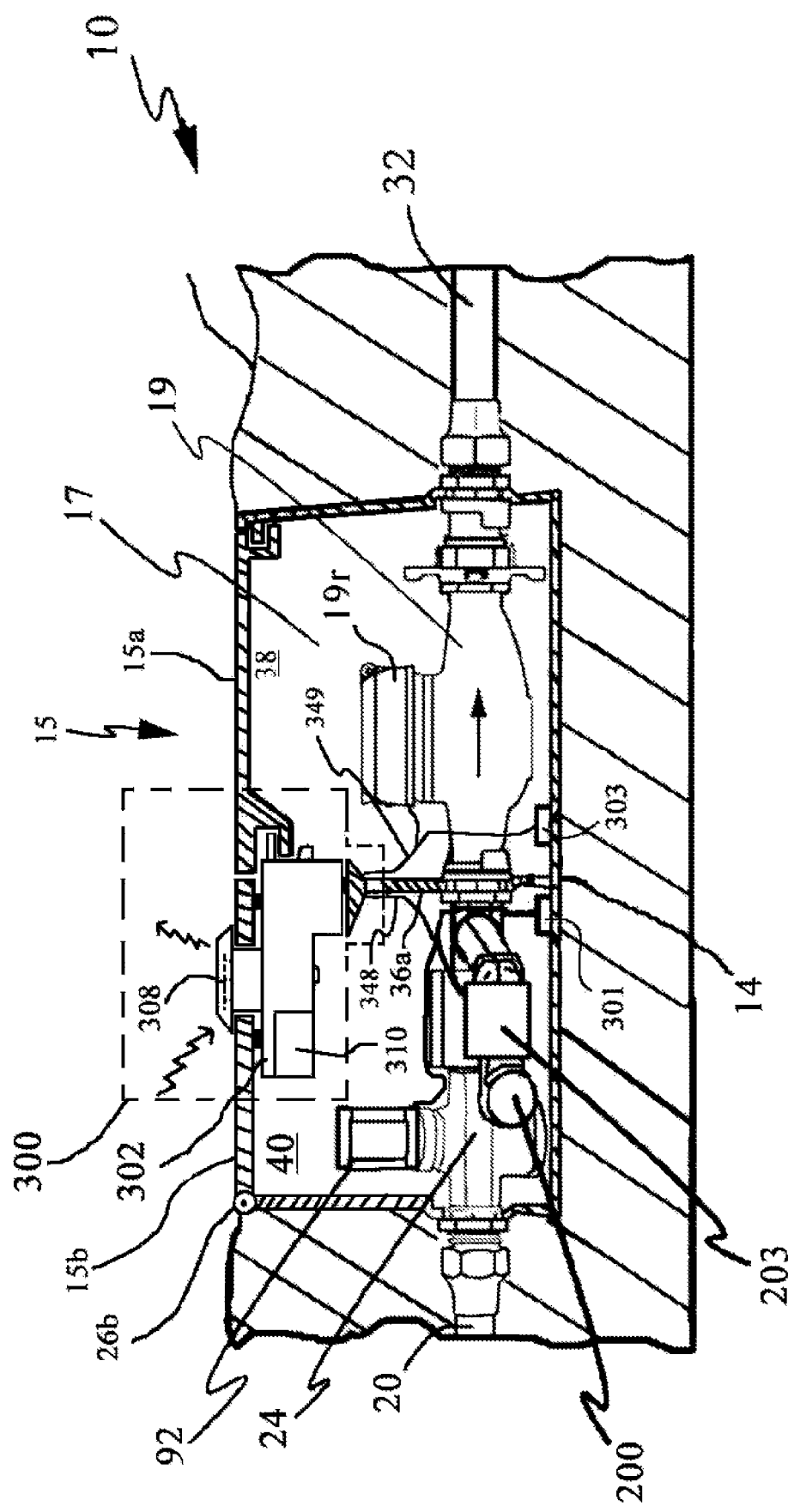

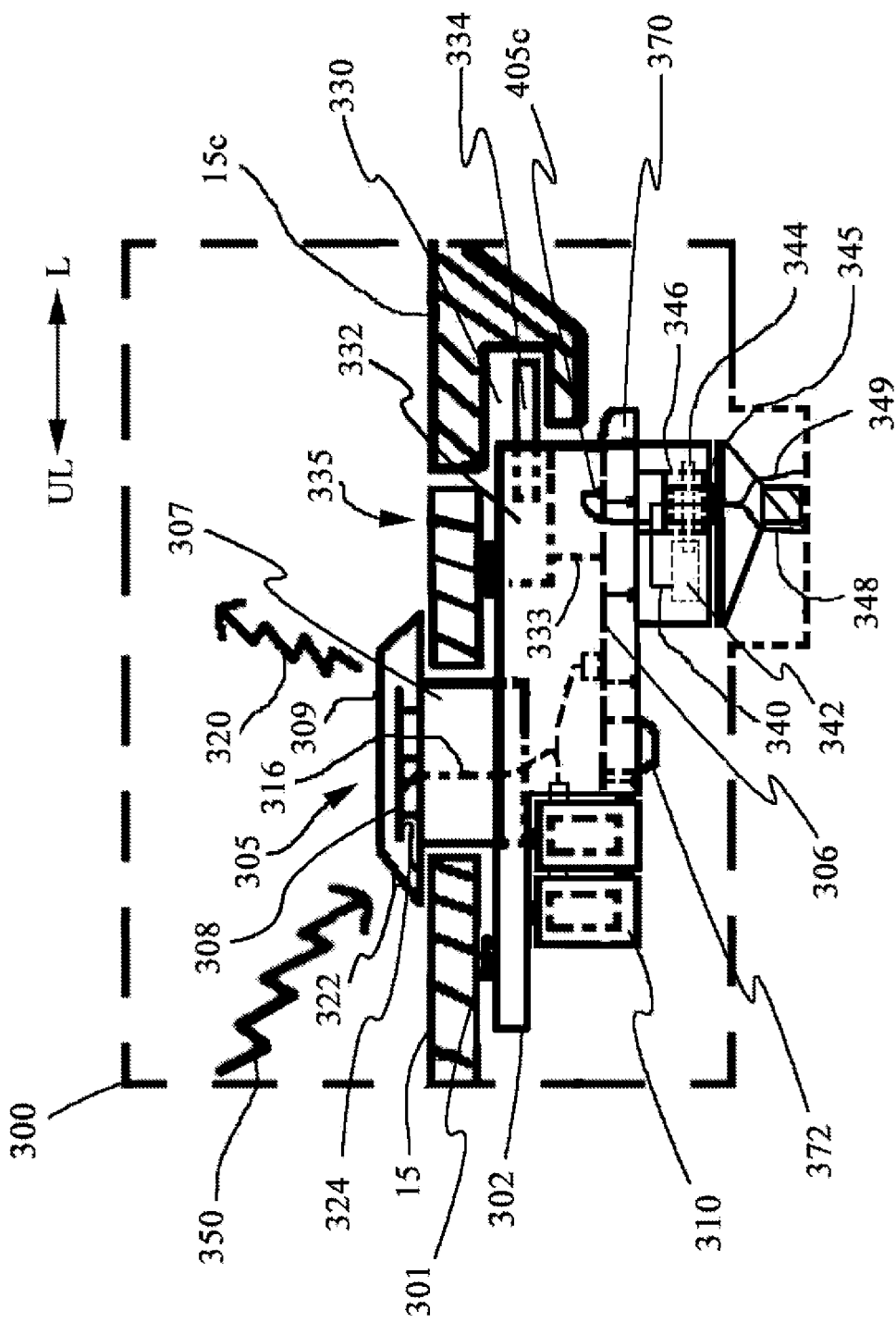

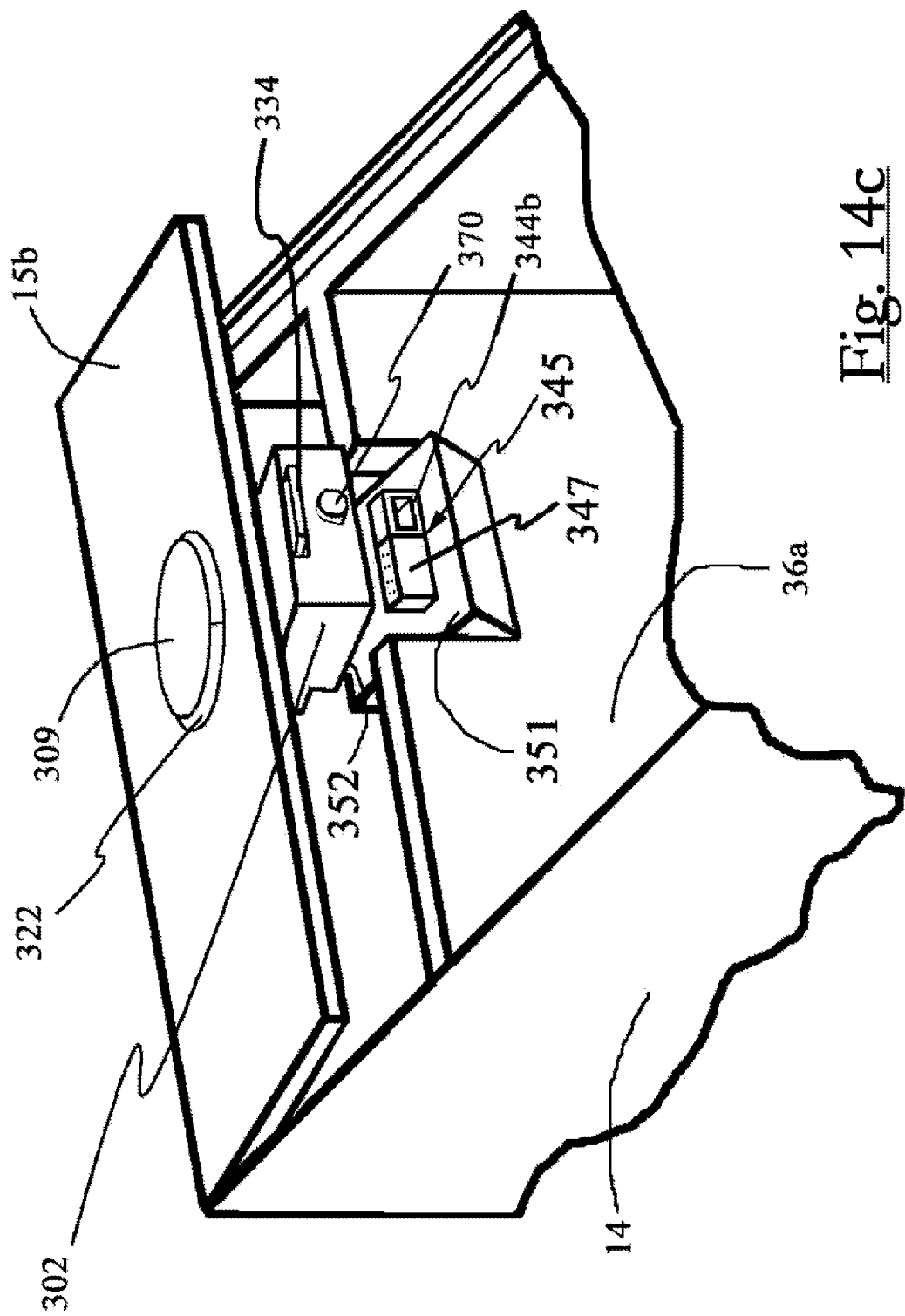

Date : 9/11/2020

Customer Number: 1234567-89
Address: 100 Liberty St
         New York, NY 10281

Location: (40' 42' 43.16 N, 74' 00' 45.07 W)
Meter Number: 93
Meter Type: MARS Smart Meter

Consumption
Since Last Bill          : 100 Gallons
Current Daily Average    : 20 Gallons/Day
90 Day Daily Average     : 21 Gallons pH Levels
Current Level   : 6.2
5 Day Average   : 7.6
90 Day Average  : 7.5

Chlorine Levels
Current Level   : 1.1 ppm   * Warning *
5 Day Average   : 2.3 ppm
90 Day Average  : 4.5 ppm

Water Temperature
Current                        : 41.0 F
Minimum On Record              : 30.5 F
Maximum On Record              : 43.4 F
30 Day Low                     : 32.3 F
   Same Time Last Year         : 43.5 F
30 Day High                    : 52.8 F
   Past 5 Years                : 60.1 F

Water Pressure
Current          : 100.2 PSI
30 Day Low       : 96.5 PSI
30 Day High      : 105.6 PSI
90 Day Average   : 103.4

Fig. 17

CONFIGURABLE SMART UTILITY METER BOX

TECHNICAL FIELD OF THE INVENTION

The present invention relates to smart utility meter boxes. One embodiment is configured with substantially all the necessary hardware required for receiving a utility meter and for associating a utility service line to a consumer service line. The smart utility meter box may comprise various mechanical/electronic features that are selectable as desired for a particular installation. The configurable features may include a meter setter with a bypass stabilizer line, quick disconnects, EM energy converter, transmitter, receiver, remote electronic module, power source, electronic shutoff, tamper detection sensors, resources attribute sensors, environmental monitoring sensors, flow monitoring sensors, and data storage features.

BACKGROUND OF THE INVENTION

Containers for housing utility meters that meter the consumption of a resource such as gas, electricity, or water have been in use for years. One general container of interest is a water meter box, and more specifically, a water meter box configured to be installed in the ground. The mechanical features for such meter boxes have improved over the years. For example, Ford U.S. Pat. No. 3,961,528 teaches a meter box having a meter connected to service pipes within the box. Ford describes one embodiment of the invention as relating to an expansible device for setting meters in meter boxes. Similarly, Johnson U.S. Pat. No. 5,823,577 teaches an improved water meter box bottom that fastens a meter setter upright and centered within a water meter box. Such patents are incorporated by such references for all that they disclose.

Advances in electronics have revolutionized many devices that were previously the sole domain of the mechanical arts. Notably, there are numerous long felt needs in the field of containers for housing utility meters that can be addressed using electronic or electromechanical based technology.

First, municipalities often require water companies to protect the municipal water supply from contamination resulting from black flow. Restated, some water utility companies are required to use back flow prevention technology to prevent fluids from flowing in the reverse direction (from customer to the utility service line). Current methods and technologies used for preventing back flow include check valves installed at the water consumer service entrance, typically adjacent to a water flow meter and frequently installed in a meter box disposed in the ground outside a residence or building. For example, The Ford Meter Box Company supplies meter boxes with a check valve installed at the output of the meter box. One embodiment of such a check valve assembly is disclosed in Farnham, U.S. Pat. No. 5,148,828 (incorporated by this reference for all that it discloses). While such schemes work well for preventing accidental back flow from the customer to utility service line, it does not address the accidental or intentional back flow of a substance into the utility main service line from a source intentionally connected to the input normally associated with a water meter.

Unfortunately, we live in an era when there are those among us that may disconnect a water meter and intentionally pump a substance into the utility service line with the intention of causing injury and terror. For example, an unscrupulous person could rent a home/business that receives its water from a utility service line at a point just up stream relative to a point where a school receives its water from the same utility service line. Such a person could disconnect her water meter and pump a poison that can tolerate the chemicals in the water long enough to contaminate the school's water supply thereby causing injury to those who use such water.

What is needed is a back flow prevention apparatus and/or method for preventing back flow from the water meter input point to a water utility service line. There is also a need to include an accessory pathway normally closed to flow but opens and allows flow through the accessory pathway when an attempt is made to pump a substance in the reverse direction. Additionally, there is a need to monitor such an accessory pathway to detect and/or report an attempt to discharge a fluid back into the utility service line.

Similarly, there is a need for a meter box that comprises flow control elements (i.e. back flow prevention, accessory pathways, etc.) at the input access point of the box including substantially all the hardware necessary to associate a utility service line to the input of such box and a customer service line and to the output of such box as well as the hardware necessary to facilitate easy installation of a metering element inside such box.

Similarly there is a need for an integral flow control component that can be installed at the input of a meter box that can stop the flow of water in any direction, that prevents the flow of water in the reverse direction while allowing flow in the forward direction and that can generate electrical signals related to the amount of water flowing through the flow control component.

When the resource being meter is water, there is a need for resource monitoring at the water utility meter. Federal Law requires the Environmental Protection Agency (EPA) to develop regulations governing drinking water safety. To comply with such regulations, water utilities use chemical disinfection and filtration systems. Fortunately, the application of such chemical disinfection and filtration to drinking water in the United States has successfully controlled the transmission of disease-causing organisms (pathogens) through drinking water supply systems. However, the United States is still vulnerable to waterborne disease outbreaks, as demonstrated by the 1993 Milwaukee Cryptosporidium outbreak. Additionally, while disinfection (or the inactivation of infectious organisms) will continue to be a critical element of drinking water treatment, recent research confirms that disinfection can create health risks from disinfectant residuals and disinfection byproducts (DBPs). Thus, a group of regulations, known as the Microbial and Disinfection Byproduct (M-DBP) Rules, addresses two key public health concerns: (1) acute threats from microbial contamination and (2) chronic threats from disinfectant residuals and byproducts of disinfection. Consequently, there is a need for smart boxes that can measure and provide water quality data to water utilities and water consumers that maybe help detect the presents of DBPs.

SUMMARY

Some of the objects and advantages of the invention will now be set forth in the following description, while other objects and advantages of the invention may be obvious from the description, or may be learned through practice of the invention.

Broadly speaking, a principle object of the present invention is to provide a smart container for associating a utility service line to a customer service line where the container is configure to receive a metering element. Flow control components are disposed at the input of the container that prevents unintentional and intentional back flow conditions and monitors the flow control components for a back flow condition.

Another general object of the present invention is to provide a modular container for housing a utility meter, wherein the container is configured for associating a customer service line to a utility service line. The container is configured for receiving flow control components at an input access point for the container. The flow control components are electrically associated with a processing device configured to generate control signals for controlling the flow control components and further configured to receive signals from such flow control components.

Still another general object of the present invention is to provide a configurable smart container for housing a utility meter that includes a processing device electrically associated with at least one sensor for monitoring a plurality of environment parameters including, temperature, chlorine, water level, and light level.

Yet another general object of the present invention is to provide a configurable smart container for housing a utility meter that includes a processing device electrically associated with flow control components and resource sensors, said processor configured for monitoring a plurality of resource parameters including pressure, flow rate, pH level, temperature and other parameters.

Still another general object of the present invention is to provide a configurable smart container for housing a utility meter that includes a processing device electrically associated with imaging elements and audio elements configured for providing a plurality of visual and audio data which may include an image of an analog readout, an image of the container environment, and sound data in the vicinity of the meter.

A further object of the present invention is to provide a smart container system comprising at least one communication device configured for transferring data between the meter box and an external electronic device, such data including: tamper data, environmental sensor data, resource parameter data, flow control status data, and image/audio data.

Another general object of the invention is to provide a smart container for housing a utility meter comprising a temperature control chamber electrically associated with a processing device configured for selectively altering the temperature inside the smart container.

Still another general object of the invention is to provide for a remote module configure to provide a resource customer (1) with access to the smart container data, (2) with a way of securely purchasing a unit of resource, (3) a way to securely pay a monthly bill, and (4) a way to remotely turn off resource flow at the meter box.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

One exemplary embodiment of the present invention relates a self contained box configured for associating a utility service line with a customer service line and further configured for receiving a utility meter that meters the flow of a consumable resource such as water.

As used in this document "self contained" simply means that the box contains substantially all the hardware necessary to associate the input of the box to the utility service line and the output of the box to a customer service line.

For this exemplary embodiment, the box comprises a body defining a cavity for receiving a first flow control element, a second flow control element, and a utility meter. A top is movably associated with the body for allowing access to the cavity. An inlet access component having a first inlet end and a second inlet end is provided where the inlet access component extends from the second inlet end located inside the cavity, extends through the body and to the first inlet end located outside body. The first inlet end is configured for being associated with a utility service line thereby providing a resource flow path from the utility service into the self contained box.

The second inlet end is associated with the input of a first flow control element disposed inside said cavity and wherein the output of such first flow control element is associated with the input of a second flow control element and wherein the output of such second flow control element is configured for being associated with the input of a utility meter thereby providing a resource flow path from the utility service line to said utility meter.

The first flow control element may be a backflow-prevention element with the second flow control element being a flow-shutoff valve. Alternatively, the first flow control element may be a flow-shutoff valve with the backflow-prevention element being the second flow control component. It should also be appreciated that the backflow-prevention element and said flow-shutoff-valve may be housed in individual housings or they may be integrated into a single housing forming a single flow control component. Notably the flow-shutoff valve may be a manually actuated flow shutoff valve or an electronically actuated flow-shutoff valve configured to receive control signals from and electronic device.

Similarly an outlet access component having a first outlet end and a second outlet end is provided where the outlet access component extends from the second outlet end located inside said cavity, through said body and to the first outlet end located outside the body. The second outlet end is configured for being associated with the output of said utility meter thereby providing a resource flow path from the meter to the outlet access component. The first outlet end is configured to being associated with a customer service line thereby providing a resource flow path out of the self contained box to the customer service line.

The box may further comprise an internal wall that divides said cavity into a first section and second section. At least a portion of said internal wall is movably associated with said body. Preferably, the first flow control element and second flow control element are disposed within one section with the other section being configured to receive the utility meter.

The box may further comprise a release-valve in fluid communication with the output side of said black-flow-prevention element. This release-valve is preferably configured to open when the resource pressure at the input of the release-valve reaches a predefined value.

The box may further comprise a processing device electrically associated with a memory and a power source. For such a configuration, a communication buss is electrically associated with the processing device and configured for transferring data between such processing device and an electronic devices electrically associated with said communication buss. A power-interface may be further provided for electrically associating the power source to an external electronic device or an external power delivery system configured for recharging the power source and/or supply power to the box electronics.

The box may further comprise a release-valve in fluid communication with the output of said backflow-prevention element. Such release-valve may comprise an input and output separated by a valve-gate configured to provide a resource flow path through said release-valve when said resource exerts a predefined force on the valve-gate. For this embodiment, a status indicator is electrically associated with the processing device and is configure to indicate the status of the release-valve.

Yet another exemplary embodiment of the present invention relates to a smart meter box configured for associating a water utility service line to a customer service line. The smart box is configured to receive a utility meter that meters the flow of water. The smart box comprises a body having a top cover wherein the body defines a cavity configured for receiving a flow control element and a metering element. A flow control element is provided for controlling the flow of water into the smart box. An inlet access component is provided having a first inlet end and a second inlet end. The first inlet end is configured for being associated with a utility service line while the second end is associated with the input of the at least one flow control element. Similarly, the output of the at least one flow control element is configured for being associated with the input of a utility meter. Such a configuration provides a flow path from said utility service line to the output of said at least one flow control element.

This embodiment of the smart box further comprises an outlet access component comprising a first outlet end and a second outlet end. The first outlet end is configured for being associated with a customer service line and the second outlet end is configured for being associated with the output of a utility meter. Such a configuration provides for a flow path from said second outlet end to said customer service line.

This exemplarily embodiment of the smart box further comprises a processing device electrically associated with a memory. A power source is electrically associated with the processing device and is configured for supplying power to the smart box's electrical components. Additionally, at least one data-transfer-facilitator is electrically associated with the processing device. The at least one data-transfer-facilitator comprises at least one of (a) transmitter configured for transmitting a data-signal to a remote receiver and (b) a communications interface configured for transferring data to an electronic device such as a water meter disposed within said body. The processing device is preferably configured to use the data-transfer-facilitator to transfer data to remote electronic devices.

This embodiment of the smart box further comprises at least one sensor disposed within the cavity. The sensor is electrically associated with said processing device, wherein said sensor is configured for providing sensor-signals to said processing device. Exemplarily sensors include a chlorine sensor, a temperature sensor, a water level sensor, a water pressure sensor, a light sensor, a release-valve sensor, and a door open sensor. Warning-criteria may be stored in the memory associated with the processing device. The processing device may be configured to monitor sensor-signals generated by the various sensors within the smart box and issue warnings when the processing device determines said sensor-signals satisfy a warning-criteria condition. The processing device may be further configured to receive a data signal from a remote electronic device comprising warning-criteria-update-information. Such may be used to update the warning-criteria stored in memory.

The at least one sensor may be a chlorine sensor that generates a sensor-signal indicative of the amount of chlorine detected in the vicinity of the chlorine sensor. Depending on the placement of the sensor, the presence of chlorine may signify a leak. The processing device may be further configured to generate a leak-warning-signal when chlorine sensor-signal meets a predefined warning-criteria condition related to chlorine.

The at least one sensor may be sensor a temperature sensor that generates a sensor-signal indicative of a measured temperature in the vicinity of the sensor. Such information may be useful in water meter applications, for example, when the temperature in the box is below the freezing point of water. The processing device may be further configured to issue a temperature-warning when said sensor-signal meets a predefined warning-criteria condition related to temperature. Similarly, the smart box may further comprise a box-warmer section electrically associated with said processing device. The box-warmer section is ideally configured to generated heat and/or cold upon receiving control signals for the processing device.

The smart box my further be configured to provide data logging services. In this embodiment, the processing device is configured to receive meter-data from a utility meter disposed within the cavity and store the data in memory. The processing device may also perform data-functions comprising at least one of (a) transmitting at least part of said meter-data to a remote receive, (b) storing said meter-data in said memory, and (c) perform data-management routines using at least part of said meter-data.

Another embodiment of the smart box comprises a flow sensor disposed between said input access point and output access point. The flow sensor is electrically associated with the processing device and is configured for generating flow sensor signals related to the amount of water flowing through the input access point and a digital representation of the sensor signal may be store in memory along with flow-data-warning-criteria. The processing device may be further configured to evaluate said flow sensor signals and issue a warning when the flow sensor signals satisfy a flow-data-warning-criteria condition. Such a warning might include: (a) no flow warning; (b) large leak warning; (c) leak warning; and (e) backflow warning.

Other sensor technologies that may be included in the smart box include: (a) a water pressure sensor configured for generating sensor-signals indicative of the water pressure at the input connector, (b) a light sensor configured for generating sensor-signals indicative of the amount of light in the vicinity of the light sensor, and (c) a top open sensor configured for generating sensor-signals indicative of the opened/closed status of said top.

The smart box may further comprise an electronic lock electrically associated with the power source and controlled by a magnetic component. The electronic lock is mechanically associated with said body and the top cover. The electronic lock is configured to secure said top cover to said body when in the locked state. The electronic lock is configured to change states when said magnetic component is subjected to a magnetic field of a predefined strength.

The smart box may further include at least one imaging element disposed in the cavity at an image-element-location that provides images of a water meter disposed within such cavity. The image-element-location may be selected to provide images showing a readout value generated by a water meter.

It should be appreciated that the processing device, memory, and data-transfer-facilitator may be separate components or integral components of an electronic module. Additionally, the smart box may further comprise a divider-wall for dividing the cavity into at least two sections, wherein said processing device, memory, and data-transfer-facilitator are disposed in a first section with a second section configured for receiving a water meter.

Still another embodiment of the invention is a meter box configured for associating a water utility service line with a customer service line where the meter box is further configured for receiving a utility meter that meters the flow of water. The meter box comprises a body that defines a cavity for receiving a water meter. A top is movably associated with the body for allowing access to said cavity.

A flow control component is disposed at least partially inside said cavity and comprises an input, an output, a shut-off valve, and a backflow-prevention-element. The shut-off valve may be a manual valve or an electronic shut-off valve configured for receiving control signals from a processing device. Exemplarily embodiments of an electronic-shut off valve include a magnetic latching valve, a motor driven valve, and a solenoid valve.

The flow-shutoff-valve comprises an electronic component in communication with an external electronic device associated with a utility meter wherein such electronic component is configured to automatically change the open/shut state of the flow-shutoff-valve in response to a control signal received from said external electronic device.

The meter box further comprises an inlet access component having a first inlet end and a second inlet end. The first inlet end is configured for being associated with a water utility service line and the second inlet end is associated with the input of the flow control component. The output of the flow control component is configured for associating with the input of a water meter. Such a configuration provides a flow path from said water utility service line to said second inlet end.

The meter box further comprises an outlet access component comprising a first outlet end and a second outlet end. The first outlet end is configured for being associated with a customer service line while the second outlet end is configured for being associated with the output of a water meter. Such a configuration provides for a flow path from said second outlet end to a customer service line.

The meter box further comprises a release-valve in fluid communication with the output of the flow control component. The release-valve is configured to prevent flow through the release-valve until the water pressure at the output of the flow control component reaches a predefined value. The release-valve may be configured for electrically communicating the open/closed status of said release-valve to an external processing device.

The meter box may further comprise a sensor disposed within the cavity configured for sensing an environmental parameter and further configured to generate sensor-signals indicative of the monitored environmental parameter and further configured to electrically communicate said sensor-signals to an external processing device.

The meter box may further comprise a processing device electrically associated with a memory and a power source. At least one data-transfer-facilitator is electrically associated with the processing device. Exemplary embodiments of a data-transfer-facilitator include a transmitter and a communications interface. The communications interface is configured for transferring data between an electronic device electrically associated with the interface and the transmitter is configured for transmitting a data-signal to a remote receiver.

Another embodiment of the invention relates to a flow control component for controlling the flow of a commodity flowing from a commodity provider to a commodity consumer. The flow control component comprises an input port and an output port wherein said commodity flows into said input port and out of said output port. A shut-off valve is disposed between the input port and output port wherein the shut-off valve is configured for selectively allowing and preventing the flow of the commodity through the flow control component.

The shut-off valve may be further configured with an electronic-shutoff electrically associated with a power source and a controller. Exemplary embodiments of such an electronic-shutoff include a solenoid valve and a motor driven valve.

A back flow preventor is disposed between said input port and said output port and in series with said shut-off valve. The back flow preventor is configured for preventing the flow of said commodity from said output port to the input port. One embodiment of such a back flow preventor is a flapper valve. The back flow preventor may be configured with a sensor for detecting when the said back flow preventor is engaged and preventing flow.

A flow detector may be disposed between said input and said output wherein the flow detector is configured for generating signals relatable to the amount of flow through said flow control component.

Yet another embodiment of the invention relates to a flow control component for controlling the flow of a commodity flowing from a commodity provider to a commodity consumer. The flow control component comprises an input port and an output port wherein said commodity flows into the input port and out of the output port.

An electronic shut-off valve in electrical communication with a controller is disposed between the input port and the output port and is configured for being electrically associated with a power source. The electronic shut-off valve is further configured for selectively allowing and preventing the flow of said commodity through the flow control component.

A flow sensor is disposed between the input port and the output port. The flow sensor is configured for generating flow-signals related to the direction of flow of the commodity through the flow control component. The flow sensor is in electrical communication with the controller and configured to transfer at least part of said flow-signals to said controller which generates a control-signal in response to the flow-signals. The electronic shut-off valve is further configured to change states in response to such control-signal.

Electronic-shutoff valve technologies may include a solenoid valve or a motor driven valve. Additionally, the controller and/or power source may be integral elements of said flow control component.

Another exemplary embodiment of the present invention concerns methodology for associating a water utility service line to a customer service line. The method includes the steps of providing a meter box comprising a body and a top cover movably associated with the body wherein the body defines a cavity configured for receiving a metering element. The next step is to provide a flow control element disposed at least partially inside said cavity wherein the flow control element comprises a body having a body-input and a body-output.

Next the body-input is associated with the water utility service line and the body-output is configured to be associated with a water meter input.

The next step is to provide an output-connector having a connector-input and a connector-output wherein the connector-input is configured to be associated with the output of said water meter and wherein said connector-output is configured to be associated with a customer service line.

Next a processing device electrically associated with a memory, a power source and at least one data-transfer-facilitator. The at least one data-transfer-facilitator comprises at least one of (a) a transmitter configured for transmitting a data-signal to a remote receiver and (b) a communications interface configured for transferring data between electronic devices. The processing device, memory, and data-transfer-facilitator are components of an electronic module disposed at least partially within said cavity.

At least one sensor disposed within said cavity and electrically associated with said processing device is provided. The sensor is configured for providing sensor-signals to said processing device. The at least one sensor is at least one of a chlorine sensor, temperature sensor, water level sensor, water pressure sensor, light sensor, release-valve sensor, and a door open sensor. The method may further comprise the step of configuring the processing device to use said data-transfer-facilitator to transfer sensor-data to a remote electronic device.

The method may additionally include the step of configuring the memory for storing warning-criteria. For this embodiment of the method, the processing device is configured to monitor said sensor-signals and issue a warning when the processing device determines the sensor-signals satisfy a warning-criteria condition.

The method may further include the step of configuring the processing device to receive a data signal from a remote electronic device comprising warning-criteria-update-information and updating the stored warning-criteria based on at least part of said warning-criteria-update-information.

Another exemplary embodiment of the present invention concerns methodology for preventing backflow from the input of a water meter box to a water utility service line. The method includes the steps of associating an electronic-shutoff valve with the input of a water meter box. The text step is to associate a flow sensor with the input of a water meter box and configuring the flow sensor to generate flow-signals related to the direction of water flow through the input of the water meter box. Next the electronic-shutoff valve is configured to close when said flow-signals indicate a back flow condition. The flow sensor may be electrically associated with a processing device that is electrically associated with said electronic-shutoff valve thereby electrically associating said flow sensor with said electronic-shutoff valve.

Alternatively, the flow sensor may be electrically associated to the electronic-shutoff valve through a switching device that sends a close-signal to said electronic-shutoff valve when said flow-signals indicate a back flow event is occurring. For this embodiment of the method, the switching device is further connected to a timing-device configure to measure the elapsed time after a close-signal is sent. The switching device if further configured to send an open-signal to the electronic-shutoff when the elapsed time reaches a predefined value.

Additional embodiments of the present subject matter, not necessarily expressed in this summarized section, may include and incorporate various combinations of aspects of features or parts referenced in the summarized objectives above, and/or features or components as otherwise discussed in this application.

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which:

FIG. 13 is a side view with partial cutaway section showing a smart utility box with setter (with quick disconnects and bypass stabilizer line) configured for being inserted into one of the ground or an excising utility box;

FIG. 14a depicts a side cut away view of a smart box comprising an electronic module and associated electronic components according to one exemplarily embodiment of the invention;

FIG. 14b presents a close up view of dashed-box (300) depicted in FIG. 14a;

FIG. 14c presents a side perspective view of box (10) with a top section movably associated with a box body with the top section partially open to reveal a wall post and associated communication/power connector;

FIG. 17 presents one exemplary display format for displaying smart meter box data;

Figure 1:
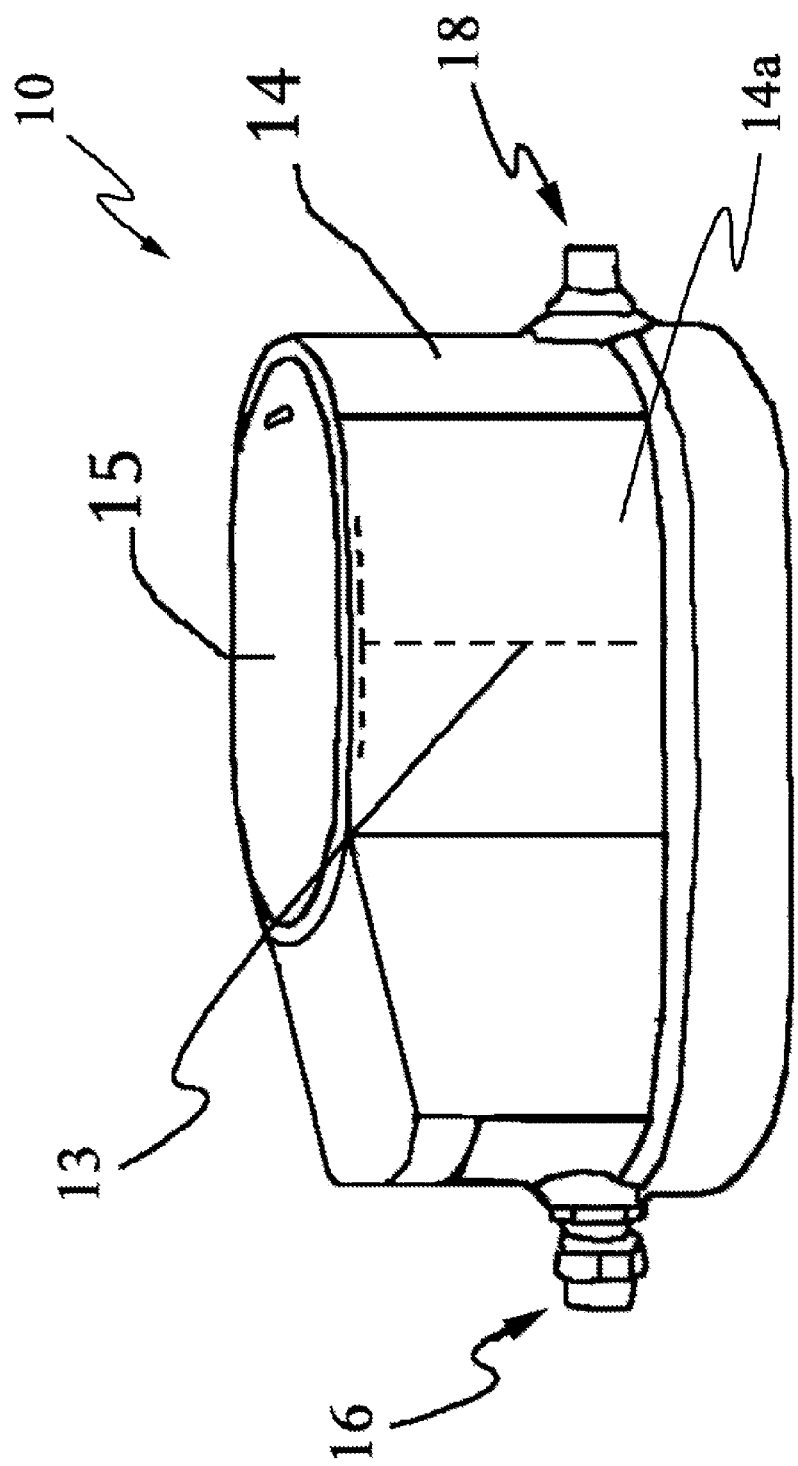
FIG. 1 is a side perspective view including a phantom image of an antenna element according to one embodiment of the present invention.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

It should be appreciated that this document contains headings. Such headings are simply place markers used for ease of reference to assist a reader and do not form part of this document or affect its construction.

For the purposes of this document, two items are "electrically associated" by bringing them together or into relationship with each other in any number of ways. For example, methods of electrically associating two electronic items/components include: (a) a direct, indirect or inductive communication connection, and (b) a direct/indirect or inductive power connection. Additionally, while the drawings illustrate various components of the system connected by a single line, it will be appreciated that such lines represent one or more connections or cables as required for the embodiment of interest.

While the particulars of the present invention and associated technology may be adapted for use with any type of utility service, the examples discussed herein are primarily in the context of water meters.

FIG. 1 is a side perspective view including a phantom image of an antenna element according to one embodiment of the present invention. A self contained box (10) is shown comprising a body (14), top (15), inlet access component (16), outlet access component (18) and an integral antenna element (13). Body (14) defines an internal cavity (17, FIG. 2) suitable for receiving a utility meter, such as the meter (19) depicted in FIG. 2. Top (15) is movably associated with body (14) allowing access to internal cavity (17) and may be secured in place by optional top lock (25) described in more detail later. As will be appreciated by those skilled in the art, such a configuration is configured for associating a utility service line (20, FIG. 2) with a customer service line (22, FIG. 2).

Body (14) and top (15) may be formed from any suitable material including plastic and steel and the various components of the system may be composed of different materials. For example, body (14) may be constructed using a plastic material while top (15) is constructed of steel. For the exemplary embodiment of the invention show in FIG. 1, body side (14a) is composed of a substantially RF transparent material with antenna element (13) disposed inside.

As is well known in the art, for underground water meter pit applications, it is not uncommon for meter pit (i.e. cavity (17)) to become filled or partially filled with water. In addition, many present day AMR systems employ transmitters associated with underground water meters that have no through pit lid antennas. Such systems simply transmit a data signal through the enclosure. While such a configuration can work reasonably well in dry pit environments, they may not work at all in a pit containing water that covers the transmitter's antenna.

Using box (10), the transmitter may be attached to side (14a) so that the transmitter's antenna is substantially adjacent to antenna element (13). Such a transmitter is preferably attached to side (14a) so that little or no water comes between the transmitter's antenna housing and side (14a). For such a configuration, those skilled in the art will appreciate that the transmitter's antenna will be capacitively coupled to antenna element (14a) even when the transmitter's antenna is covered by water. Additionally, it will be appreciated that while antenna element (13) may not have the optimal electrical length for the frequency of the transmitted signal, antenna element (13) will provide an improved propagation path where, in some environments, there is little or no path for a transmitted signal to radiate from the meter pit with significant strength to be useful.

Antenna element (13) may be constructed from any suitable material for radiating electromagnetic energy. It should be noted that one or more antennas of equal length or varying length may be disposed in one or more sides of body (14) or top (15) without departing from the spirit of the present invention.

Alternatively, for yet another embodiment of the invention, side (14a) comprises a compartment configured to receive an antenna. For such a configuration, a user may selectively install a desired antenna element (13) as well as change or service antenna element (13) as desired.

Figure 2:
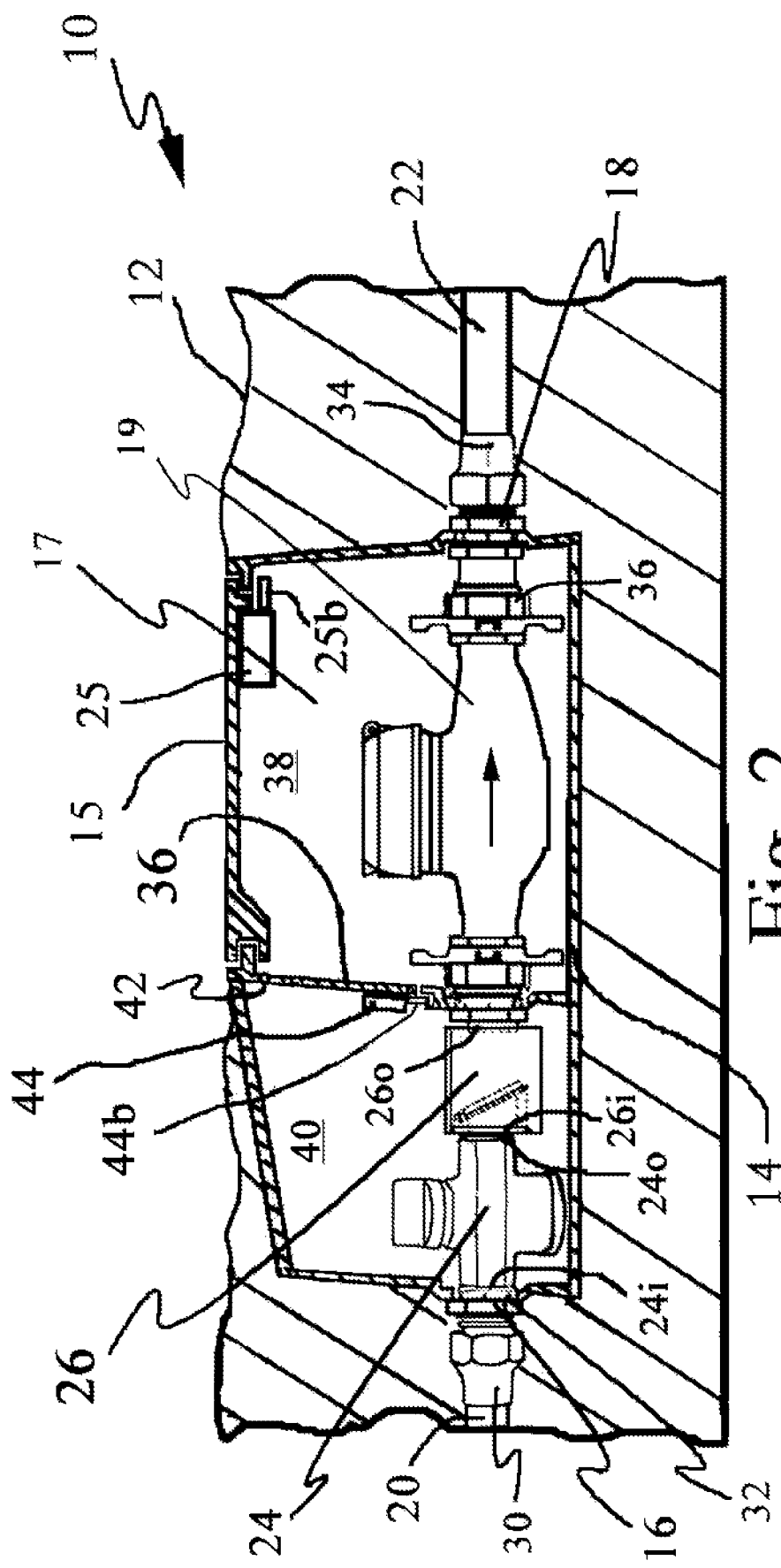
FIG. 2 is a side cut away view of self contained box (10) installed in the ground with top (15) generally at ground level (12)

Referring now to FIG. 2, a side cut away view of box (10) installed in an underground environment is depicted. Top (15) is generally at ground level (12). Box (10) comprises a first flow control element (24) having an input (24i) and an output (24o) and a second flow control element (26) having an input (26i) and an output (26o). Inlet access component (16) comprises a first inlet end (30) and an opposing second inlet end (32). Preferably first inlet end (30) is configured for being associated with utility service line (20) with second inlet end (32) being associated with the input (24i) of first flow control element (24) disposed at least partially within cavity (17). It will be appreciated that inlet access component (16) may be integrated into first flow control element (24) without departing from the scope of the present invention.

Similarly, output (24o) of said first flow control element (24) is associated with the input (26i) of second flow control element (26) with the output (26o) of second flow control element (26) suitable for being associated with the input of a utility meter. It will be appreciated that such a configuration provides a resource flow path from utility service line (20) to second flow control element output (26o).

For the purposes of this document, two items may be associated in any number of ways. For example, second inlet end (32) may be associated with the input (24i) thorough a direct connection with the appropriated fittings or through a length of pipe with one ore more components disposed between input (24*i*) and second inlet end (32). Additionally, two items may be associated with each other using a multitude of fitting technologies well known by those skilled in the art and a detailed description thereof is not considered necessary for purposes of describing the method and system according to the present invention.

Outlet access component (18) is shown disposed at the output side of box (10). Outlet access component (18) comprises a first outlet end (34) and a second outlet end (36). First outlet end (34) is preferably configured for being associated with a customer service line (22) and second outlet end (36) is configured for being associated with the output of a utility meter. It should be appreciated that such a configuration provides a resource flow path from second outlet end (36) to customer service line (22). When a meter (such as meter (19)) is installed in box (10), a resource flow path is provided from utility service line (20) to customer service line (22). Notably, additional flow control components, such as a check valve, may be disposed between the meter and outlet access component (18) without departing from the scope of the invention.

Body (14) may further comprise one or more internal walls that divide cavity (17) into one or more sections although only one cavity is sufficient for some embodiments of the invention. As depicted in FIG. 2, internal wall (36) divides cavity (17) into a first section (38) and second section (40). At least a portion of internal wall (36) is preferably movably associated with body (14) and may be secured in place by optional wall lock (44) described in more detail later. For the embodiment depicted in FIG. 2 internal wall (36) comprises pivot point (42). Preferably, the box (10) flow control components and elements and electronic modules (as described later) are disposed within one section with the metering element disposed in a different section. For the embodiment depicted in FIG. 2, the first flow control element (24) and the said second flow control element (26) are disposed within second section (40) with the first section (38) configured to receive a utility meter. Notably, while FIG. 2 shows top (15) covering only the first section (38), embodiments where top (15) covers all internal sections fall within the scope and spirit of the invention.

Flow Control Components

Attention is now directed to the various flow control components and elements according to certain embodiments of the invention. As shown in FIG. 2, box (10) comprises a first flow control element (24) having an input (24*i*) and an output (24*o*) and a second flow control element (26) having an input (26*i*) and an output (26*o*). For the embodiment of the invention as depicted in FIG. 2, the first flow control element is a flow-shutoff-valve (24) and the second flow control element is a backflow-prevention element (26) with such elements connected in series. It will be appreciated that the order of such elements may be switched without departing from the intended scope and spirit of the invention.

Figure 4:
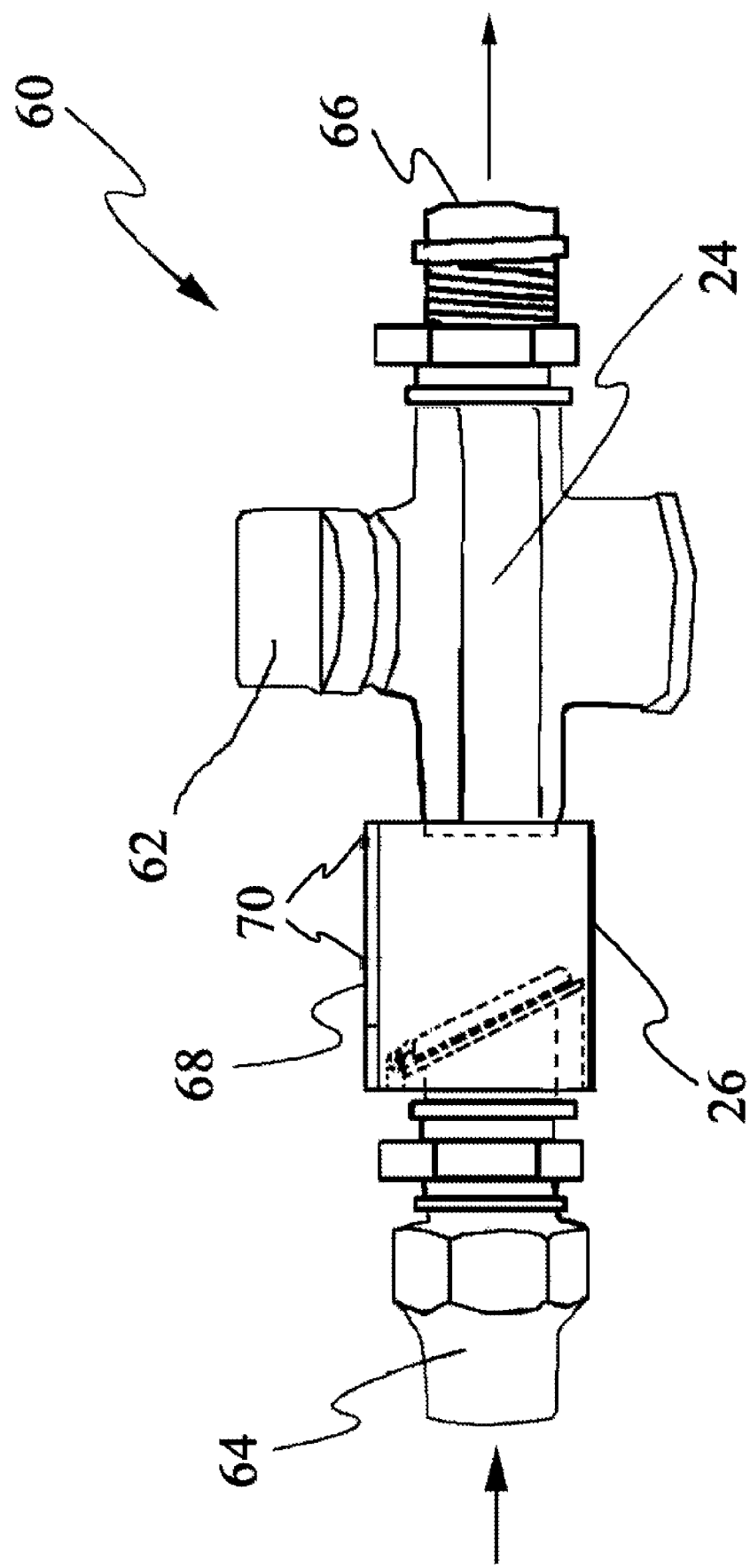
FIG. 4 depicts a side view with a partial phantom section of one exemplary embodiment of an integral flow control component (60) having an input port (64) and an output port (66)
Figure 5:
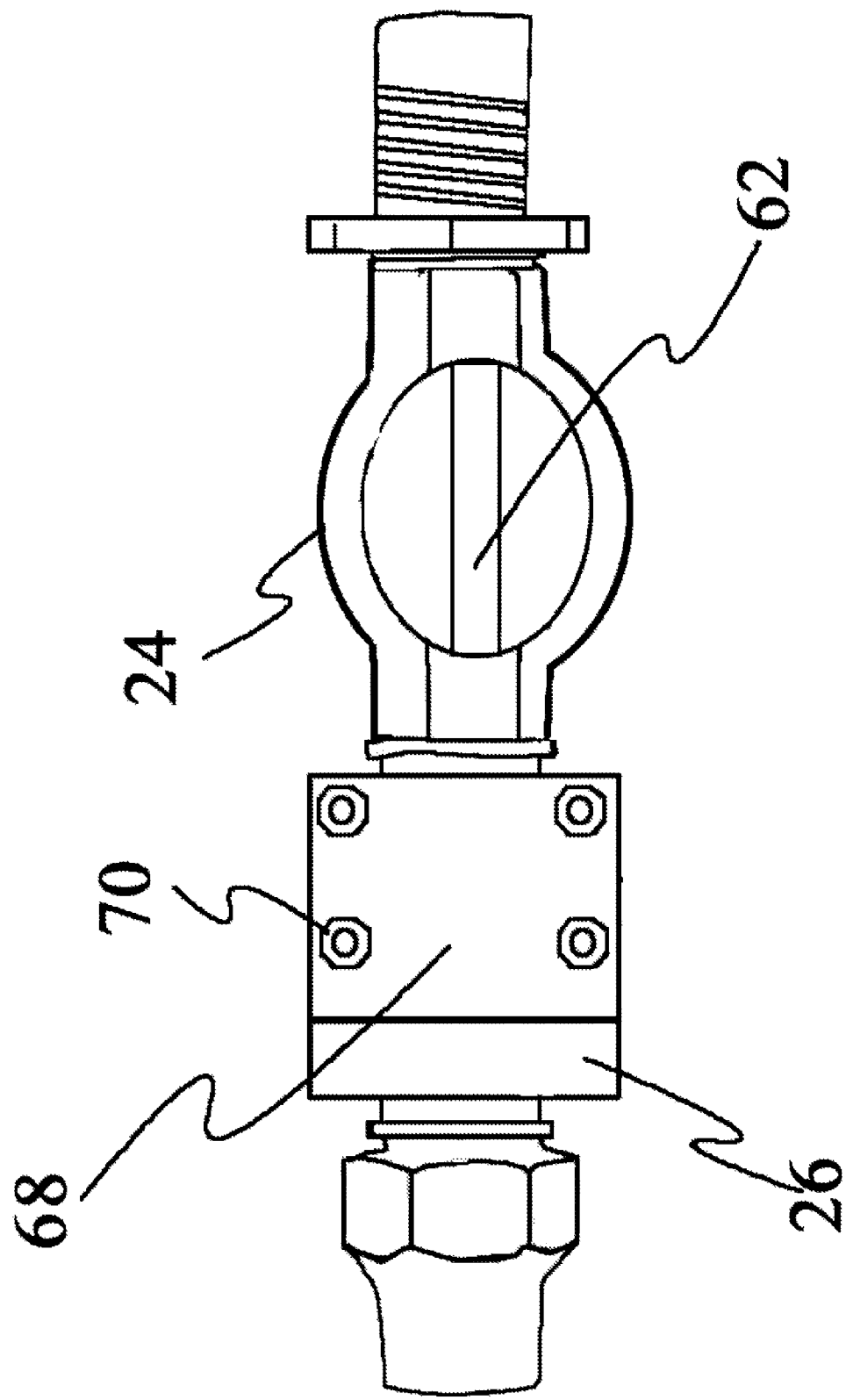
FIG. 5 is a top view of the flow control component depicted in FIG. 4.

Attention is now directed to FIG. 4. FIG. 4 depicts a side view with a partial phantom section of one exemplary embodiment of an integral flow control component (60) having an input port (64) and an output port (66). Similarly, FIG. 5 is a top view of the flow control component depicted in FIG. 4. While flow control component (60) is one integral component, such a flow control component may be formed by combining a plurality of flow control components without departing from the intended scope of this invention. Flow control component (60) includes a first section comprising a manual shutoff-valve (24) and a second section comprising a backflow-prevention element (26) disposed in series between input port (64) and output port (66). For this configuration, a resource flows into the flow control element (60) through input port (64) and out of the flow control element (60) through output port (66).

For the embodiment shown in FIG. 4, shutoff-valve (24) is a ball valve comprising a manual twist control (62) configured for selectively allowing (on) and preventing (off) the flow of a commodity through flow control component (60). It will be appreciated that any number of valve technologies may be used in place of shutoff-valve (24).

Backflow-prevention element (26) is disposed between input port (64) and output port (66) and in series with shutoff-valve (24). Backflow-prevention element (26) is configured for preventing the flow of a commodity from the output port (66) to the input port (64) (i.e. in the reverse direction). For the embodiment shown in FIG. 4, backflow-prevention element (26) is a flapper valve although any type of valve technology may be used (e.g. check valves). As shown in FIG. 4 and FIG. 5, flapper-valve top (68) is removably associated with the flapper valve housing using fastening elements (70) (e.g. bolts, screws, etc.). Such a configuration allows access to the flapper valve for servicing and/or testing.

Figure 6:
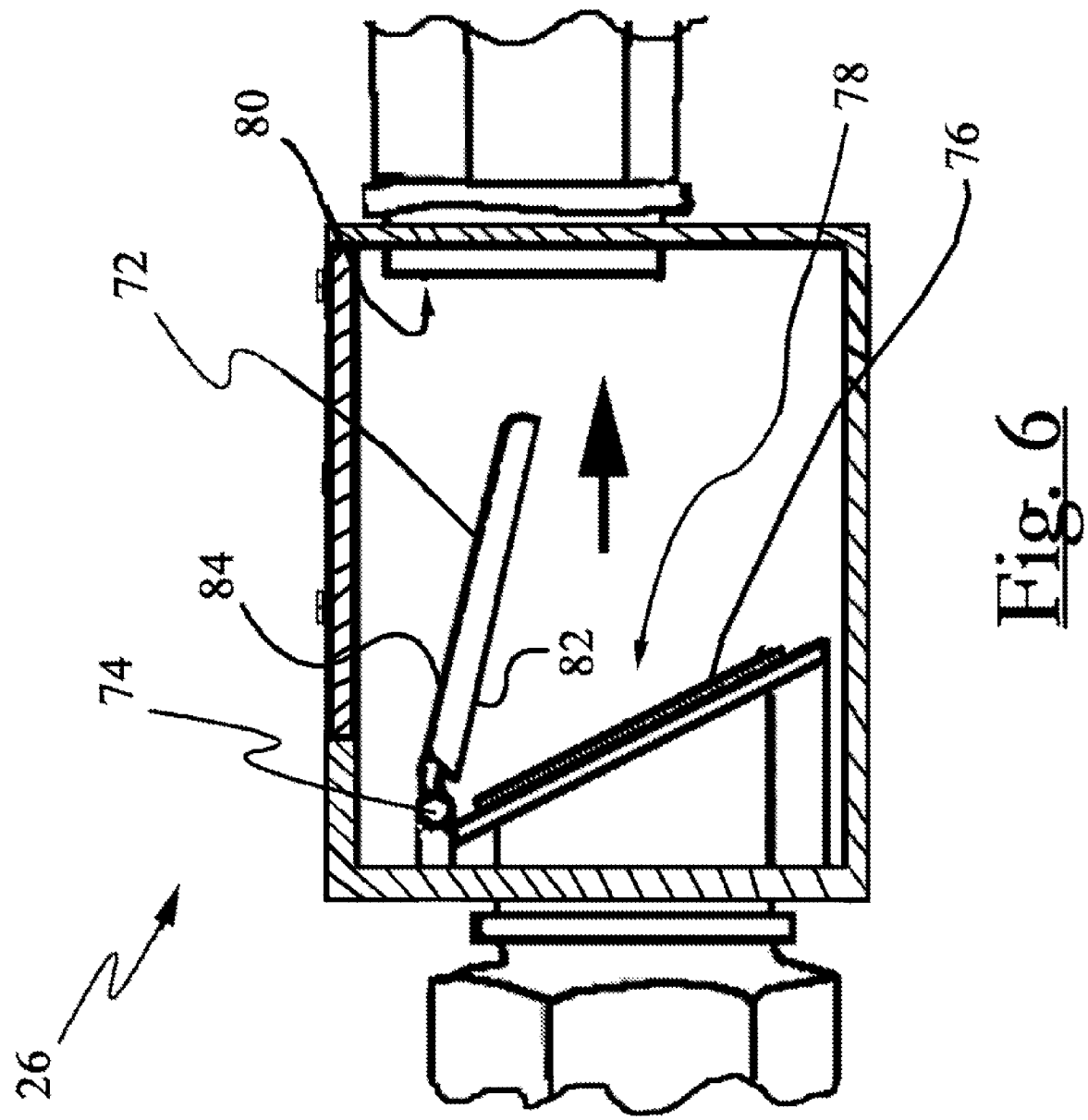
FIG. 6 is a partial cut away section of a flow control component showing a flapper valve.

Attention is not directed to FIG. 6 which depicts a partial cut away section of flow control component (60) that is depicted in FIG. 4. As shown in FIG. 6, a flapper (72) is pivotally associated with the flapper valve housing by flapper rod (74). For this embodiment of the invention, flapper rod (74) is spring loaded to bias flapper (72) open in no flow conditions. The spring constant for the spring loaded flapper rod (74) may be any value desired, however, for the preferred embodiment, such spring constant is selected to minimize backflow while keeping flapper (72) open in no flow conditions. Alternatively, flapper (72) may be simply constructed of a material that floats. Additionally, a damping force may be added so as to provide for hysteresis to minimize flapper chatter. Such damping force technologies are known and understood by those skilled in the art, and a detailed explanation thereof is not necessary for purposes of describing the method and system according to the present invention.

One of ordinary skill in the art will appreciate that spring loaded flapper rod (74) will keep flapper (72) in the open position until there is sufficient flow in the reverse direction (from opening (80) to opening (78)) to apply more force on flapper side (84) than is present on flapper side (82) plus any "spring force" exerted by flapper rod (74). When a back flow event occurs, flapper (72) interfaces with flapper seat (76) thereby closing opening (78) and preventing all or substantially all backflow. The input and output may be in vertical alignment as shown if FIG. 4 or they may be off set as shown in FIG. 6.

With such a configuration, one of ordinary skill in the art will note that head loss caused by backflow-prevention element (26) is minimized for a substance flowing from input port (64) to output port (66). Additionally, keeping the flapper (72) open until a backflow condition occurs provides for one method of detecting a backflow condition as described later.

Figure 7:
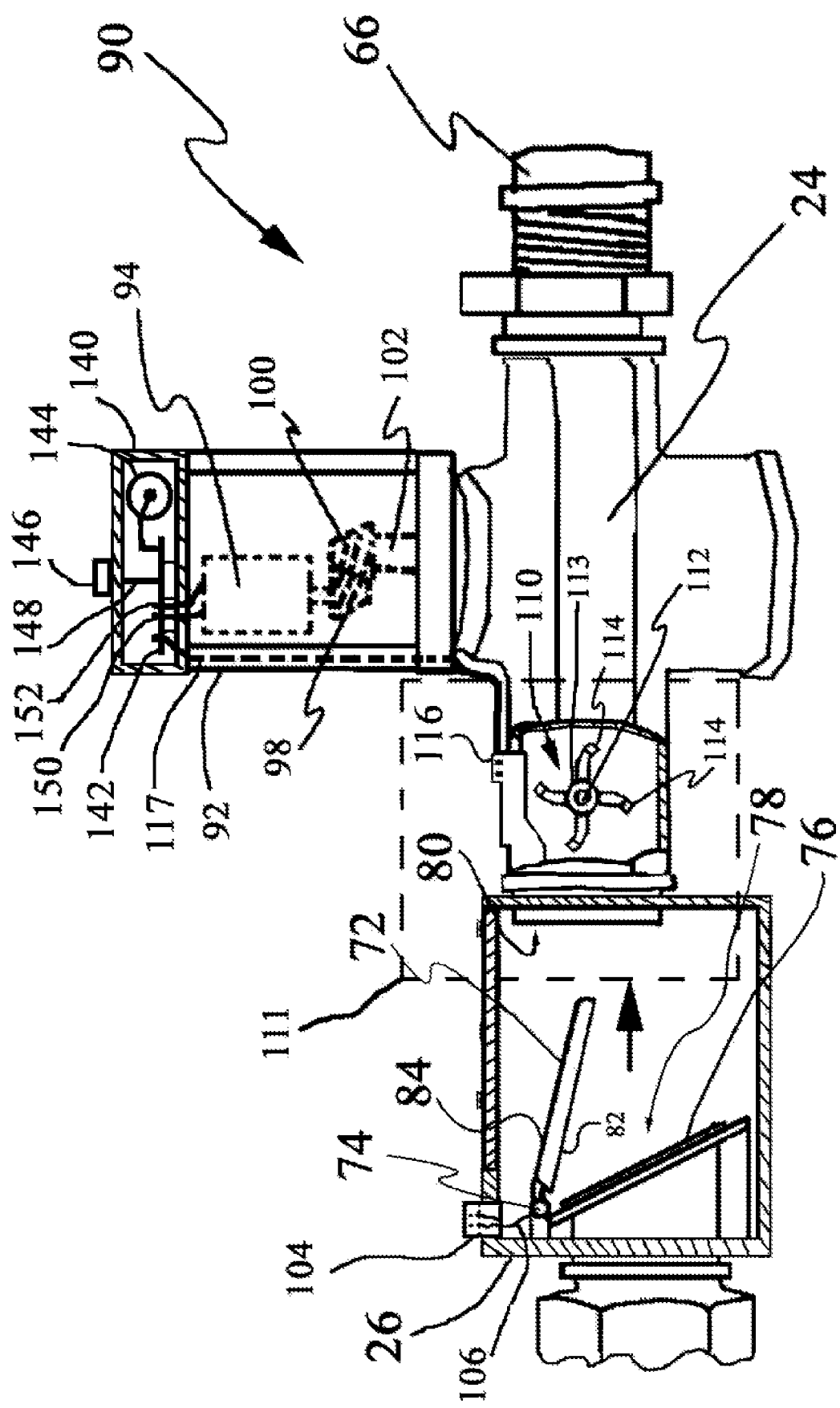
FIG. 7 is a side view with partial cut away sections and a phantom view of an alternative embodiment of one embodiment of an integral flow control component comprising an electronic shutoff, a flow sensor, and a back flow prevention element.

Attention is now directed to FIG. 7. FIG. 7 is a side view with partial cut away sections and a phantom view of an alternative embodiment of an integral flow control component comprising an electronic shutoff, a flow sensor, and a backflow-prevention element. For this embodiment, flow-control-component (90) comprises a shutoff-valve (24) with integral electronic shutoff (92). Flow-control-component (90) further comprises back-flow-prevention element (26) and flow sensor (110).

Electronic shutoff (92) may comprise any number of technologies including a latching solenoid plunging valve, (b) a motor driven valve, and (c) a magnetic latching valve. For the embodiment show in FIG. 7, the electronic-shutoff (92) is a motor driven valve that comprises an electric motor (94) electrically associated with a controller (140). Controller (140) is electrically associated with external devices via interface (146) and conductors (148). Conductors (148) may comprise one or more signal and/or power connections as required for communicating with, supplying power to, or receiving power from an external electronic device.

For the present embodiment, interface (146) is a connector configured for electrically associating controller (140) with external electronic devices. Alternatively, interface (146) may be a wireless interface (e.g. Bluetooth) configured to receive a data signal via radiated EM energy. For such an embodiment, interface (146) may be disposed on controller board (142).

Controller (140) comprises a switching device disposed on controller board (142) and configured to respond to control signals from external electronic devices such as meter (19). The switching device may be a simple electronic switch, a mechanical switch, or a more complex smart switch that includes its own processing device and circuitry for receiving a control signal. For the present embodiment of the invention, the switching device is a solid state switch that selectively applies power to motor (94) via motor power lines (150, 152) in response to control signals received over interface (146). Such control signals may be generated by: (a) direction-indicator (120, FIG. 8) (to prevent backflow as described later), (b) an external device electrically associated with interface (146), or (c) a control program being executed by a processing device disposed on controller board (142).

By selectively applying power to power lines (150) and (152), the motor's shaft will rotate in a desired direction causing motor-worm-gear (98) to rotate in a desired direction. Motor-worm-gear (98) interfaces with shutoff-worm-gear (100) which is associated with shutoff-shaft (102). When Motor-worm-gear (98) rotates, shutoff-worm-gear (100) rotates in the opposite direction causing shutoff-shaft (102) to rotate thereby changing the state (e.g. open, closed, etc.) of the shutoff-valve (24). It should be appreciated that motor-worm-gear (98) and shutoff-worm-gear (100) may have different diameters. One of ordinary skill in the art will appreciate that such a configuration provides a "transmission" of sorts that allow, for example, motor-worm-gear (98) to be smaller than shutoff-worm-gear (100) thereby reducing the amount of torque required to rotate shutoff-worm-gear (100). For embodiments where no "transmission" is required, the worm gears may be eliminated and the shutoff shaft and motor shaft are replaced with a single shaft.

For the presently preferred embodiment of the invention, power is supplied to motor (94) by local power source (144). Alternatively, an external power source may be electrically associated with controller (140) without departing from the scope and spirit of the invention. Suitable power sources are discussed in more detail later in this document.

For the embodiment shown in FIG. 7, backflow-prevention element (26) is configured with a sensor for detecting when flapper (72) is engaged (closed) and preventing flow. For this embodiment, backflow-interface (104) is electrically associated with a simple contact sensor through electrical connections (106). The contact sensor is associated with flapper rod (74) and closes when flapper (72) has engaged flapper seat (76). Alternatively, the contact sensor could be configured to open when flapper (72) has engaged flapper seat (76). Backflow-interface (104) is configured for electrically associating backflow-prevention element (26) with an external electronic device. It should be noted that embodiments of the invention that include a direction-indicator (120, described later) may not include such a contact sensor as backflow can be detected by direction-indicator (120).

Flow-control-component (90) further comprises a flow detector (110) disposed between the input port (64, as shown in FIG. 4) and the output port (66). The various elements of one embodiment of a flow detector are enclosed in dashed-box (111) of FIG. 7 and FIG. 8. For the presently preferred embodiment, flow detector (110) is disposed between backflow-prevention element (26) and shutoff-off-valve (24). Flow detector (110) comprises a spinner (113) and a direction-indicator (120) although embodiments comprising only a spinner or only a direction-indicator fall within the scope and spirit of the invention.

Spinner (113) is rotatably associated within its housing by spinner rod (112). Spinner (113) comprises a center hub disposed around spinner rod (112) with four curved fins extending outward from the center hub at equally spaced intervals. Magnetic elements (114) are associated with each end of such fins. It will be appreciated that any number of fins may be used and magnetic elements may be associated with only one fin or a plurality of fins as desired. One of ordinary skill in the art will appreciate that increasing the number of fins and associated magnetic elements provides for better resolution. Alternative embodiments include a spinner in the shape of a fan blade appropriately positioned and orientated in the resource flow path.

As a resource flows through flow-control-component (90) spinner (113) rotates about spinner rod (112). As spinner rod (112) rotates, the magnetic elements (114) associated with the spinner's fins pass by magnetic detector (115, FIG. 8). Magnetic detector (115) comprises at least one magnetic field sensor that generates an electrical signal upon detecting a magnetic field. Suitable technologies for such magnetic sensors include Hall Effect devices, reed switches, and weigand wires. For the preferred embodiment, the magnetic detector (115) is a weigand wire. For such embodiment, magnetic detector (115) simply generates an electrical spike/pulse each time a magnetic element (114) passes by magnetic detector (115). Such electrical spike is preferably electrically associated with the input of a wave shaping circuit (such as a comparator) to further enhance the digital attributes of the signal. The wave shaping circuit may be internal to flow detector (110) or external to flow detector (110) without departing from the scope and sprit of the invention.

On example of a wave shaping circuit is a comparator with a programmable voltage source (although nonprogrammable voltage sources may be used) connected to one input and the output of magnetic detector (115) electrically associated with the other input. For such a configuration, when the electrical spike/pulse generated by magnetic detector (115) exceeds the voltage level supply by the programmable voltage source, the comparator generates a digital output signal having a predefined voltage level for a predefined duration in time.

A processing device (described later) is electrically associated with magnetic detector (115) (or the wave shaping circuit) through flow-detector-interface (116). The processing device is configured to count the number of spikes generated by magnetic detector (115) (or the wave shaping circuit) where such spikes are relatable to the number of rotations of spinner (113). Alternatively, flow detector (110) may be configured with an integral processing device configured for counting and storing spinner data.

It will be appreciated that flow detector (110) generates electrical signals relatable to the amount of resource flow through flow-control-component (90). As described later in this document, meter (19) may be used to determine a consumption-factor that relates the number of turns of spinner (113) to a unit of consumption.

Figure 8:
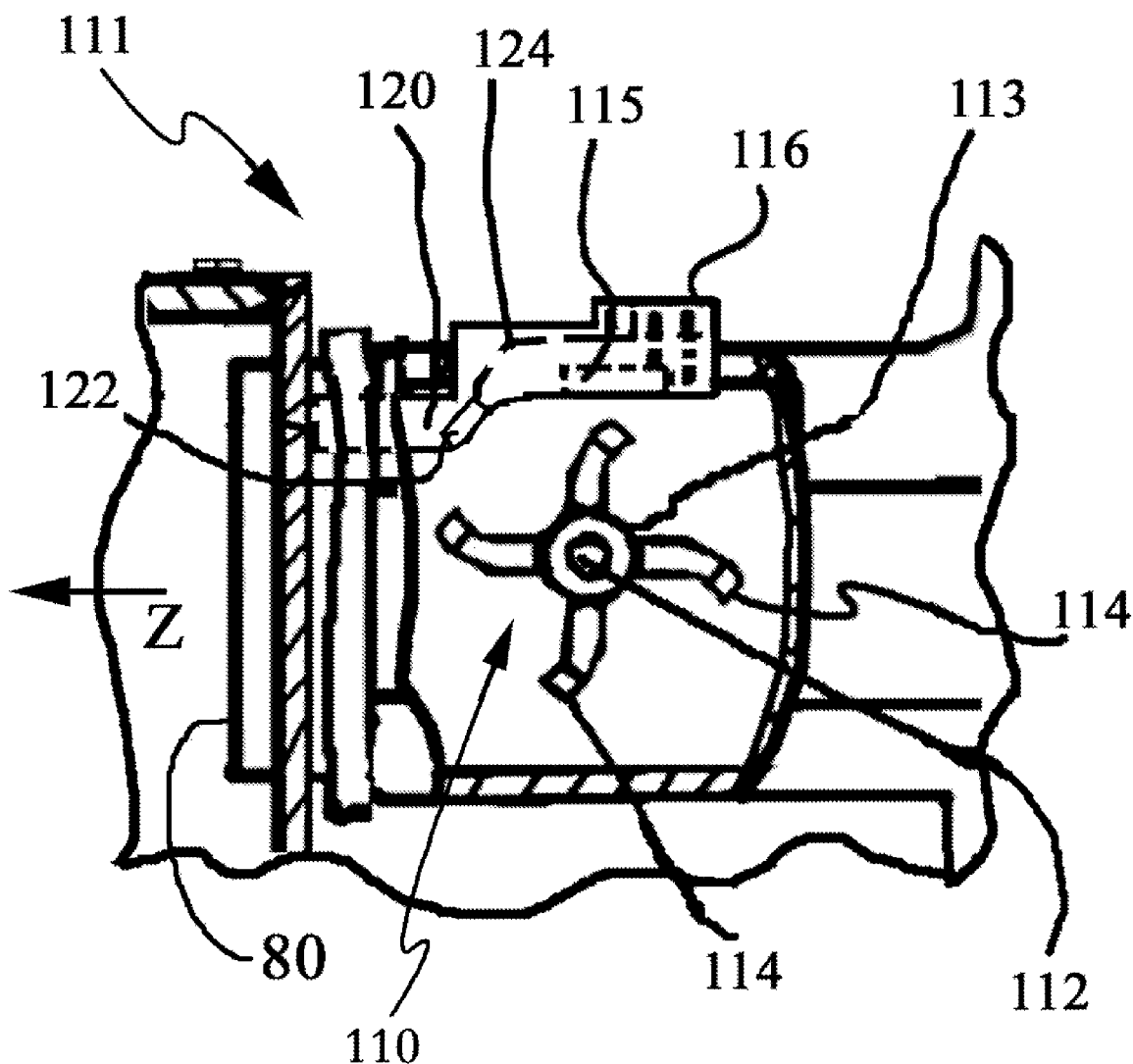
FIG. 8 is one presently preferred embodiment of a direction-indicator (120) for flow detector (110)

Still referring to FIG. 8, one presently preferred embodiment of a direction-indicator (120) for flow detector (110) is shown. For such a preferred embodiment, direction-indicator (120) comprises switch (122) that detects the direction of flow. Switch (122) comprises a magnetically responsive element that moves in the Z or –Z direction depending on the direction of rotation of spinner (113). The "–Z" direction is opposite to the Z direction. In reverse flow conditions when magnetic elements (114) are rotating in the counter clockwise direction, the magnetically responsive element moves in direction Z and makes contact configuration R (for reverse flow). In forward flow conditions, the magnetic elements (114) are rotating in the clockwise direction and the magnetically responsive element moves in the –Z direction and makes contact configuration F (for forward flow). Such contact configurations are communicated to external devices through conductor (124) which may comprise one or more signal/power lines. Such contact configuration data is used in conjunction with spinner data to determine the amount of forward and reverse flow.

For one alternative embodiment of a direction-indicator, flow detector (110) comprises three magnetic field sensors, S1, S2, and S3 (not shown). Such sensors are disposed within flow detector (110) so that each sensor detects the rotating magnetic field at a different point for any given magnetic field position. Each switch will generate a signal (by closing or opening) when such switch detects a magnetic field of sufficient strength. For forward flow, the switch signal sequence is S1, S2, and then S3. A counter (e.g. processing device) is electrically associated with switches S1, S2 and S3 and configured to detect the generated switch signals. The counter will not advance its count until all three switches have generated a switch signal. A S3, S2 and S1 switch closure sequence would indicate backflow.

Figure 9:
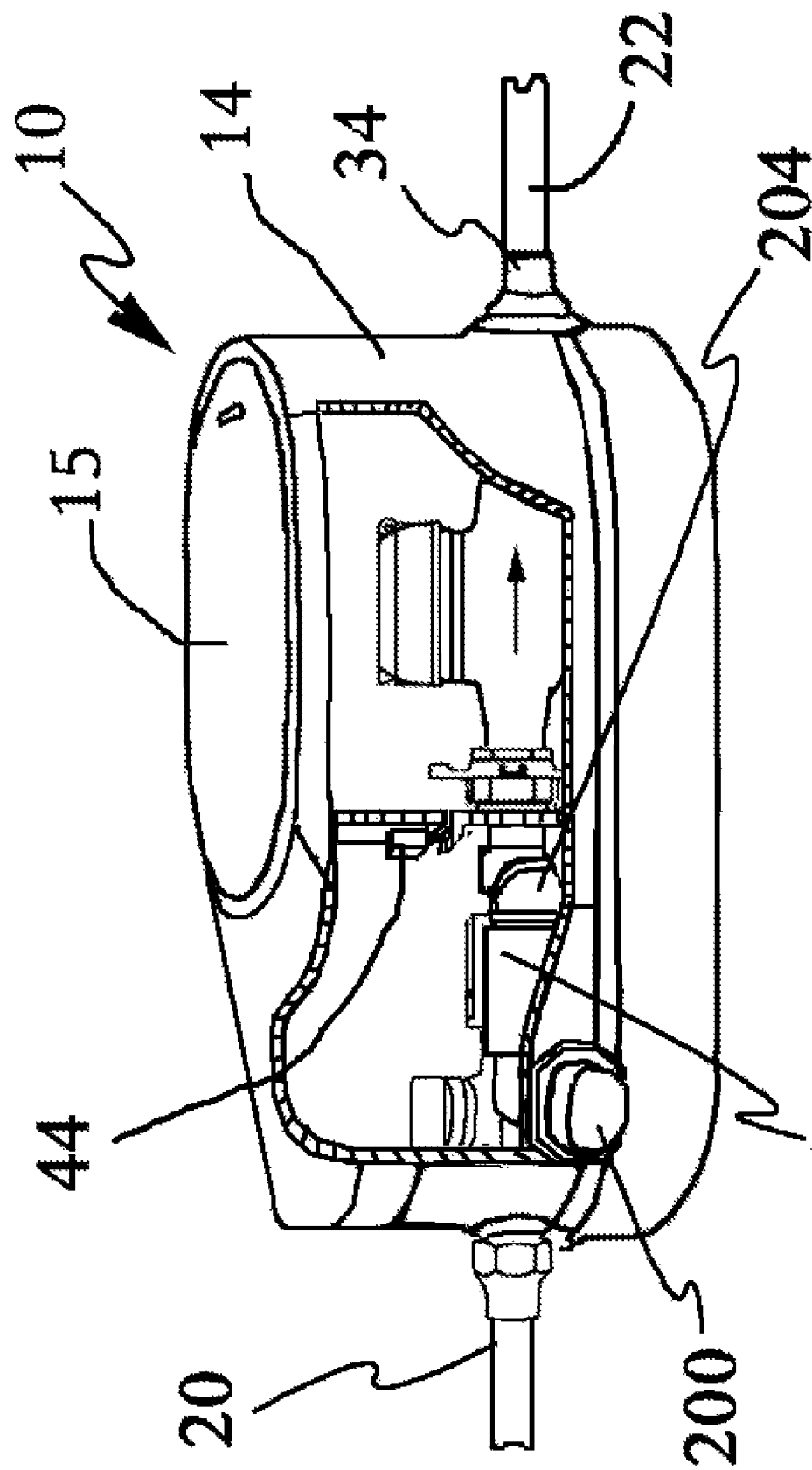
FIG. 9 is a side perspective view with a cut away section revealing a release valve associated with an accessory pathway according to one embodiment of the present invention.

Attention is now directed to FIG. 9 which is a side perspective view with a cut away section revealing a release valve associated with an accessory pathway according to one embodiment of the present invention. For the embodiment shown in FIG. 9, a release-valve (202) is in fluid communication with the output side of backflow-prevention element (26). Release-valve (202) is a self-operating valve designed to limit reverse flow pressure and to provide an accessory pathway that allows reverse flow under certain conditions. An exemplary release-valve (202) configuration would have an input and an output separated by a valve-gate configured to provide a resource flow path through said release-valve when the resource (or another substance) exerts a predefined force on the valve-gate. The predefined-open-force (pressure) would preferably be set to a value that is 10% above the force exerted by the resource at the input (20) of box (10). The release-valve may further comprise a status-indicator configured to indicate the status of the release-valve. Such a status indicator is electrically associated with a processing device (e.g. processing device (402) described later). The release-valve (202) output may be associated with accessory pathway (200) to provide a flow path out of box (10) when a backflow condition occurs.

There are a wide variety of valve designs that may be used for release valve (202) including diaphragm valves, globe valves, or swing check valves. A helical or hydraulic pressure spring may be used to maintain constant force (predefined force) acting on the backside of a valve-gate causing the valve to be normally closed. When a substance is flowing in the reverse direction as described above and such substance exerts a force on the valve-gate that is greater than the pre- defined force holding the valve-gate closed, release-valve (202) opens allowing the substance to exit release-valve (202) until the pressure at the release-valve input falls below the predefined open force pressure. It should be noted that such valves may be (a) preset to a specific predefined open force pressure by a manufacturer and not adjustable, and (b) maybe user adjustable.

As described above, release-valve (202) limits back flow pressures while potentially fooling a would-be saboteur who intends on pumping a substance into the utility water supply. For example, without release-valve (202) and without a backflow-prevention element, a person could remove a metering element disposed in cavity (17) and connect a pump to the connector that had been associated with the input of the metering element and then pump a substance back into the utilities main supply line. To do such an act, the pump would need to generate a pressure just above the water utility supply pressure (i.e. the pressure at the input of the meter box). With a backflow-prevention element installed as described above, the backflow would be prevented; however, the saboteur would be aware of the unsuccessful attempt to introduce a foreign substance into the water supply as the pump would not be able to pump fluid into the system. With the addition of a release-valve (202), installed as describe above, the would-be saboteur would believe she has pumped a substance into main supply line when she has not. In addition, a status-indicator associated with such release-valve (202) would alert a utility provider of a release-valve activation which should initiate an investigation.

Figure 10:
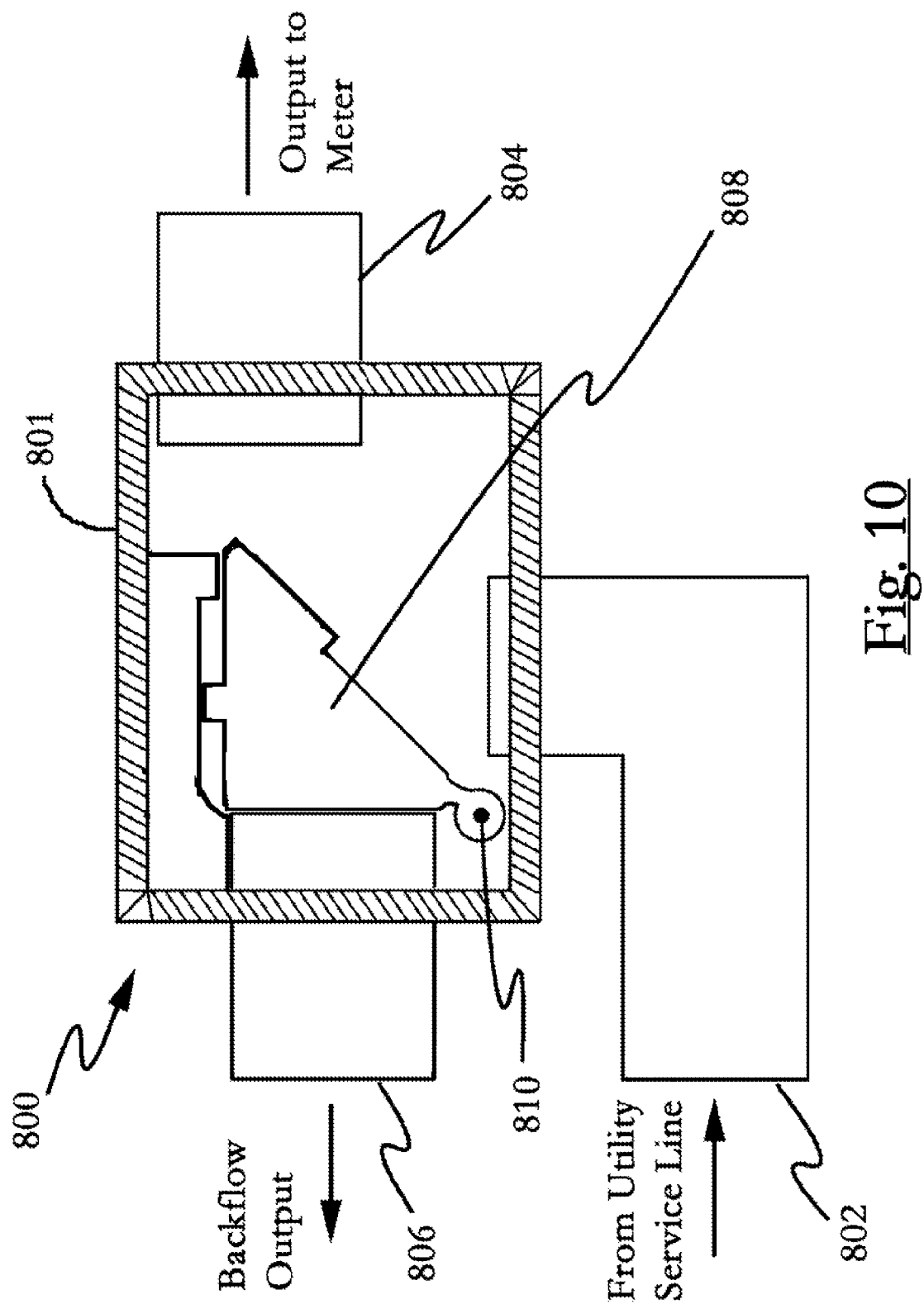
FIG. 10 is an exemplary embodiment of a two-way diverter valve for preventing backflow.

Referring now to FIG. 10, for yet another embodiment, a two-way valve (800) replaces backflow-prevention element (26). The two-way valve comprises a housing (801) with an input (802), an FF-port (804) (Forward Flow Port), a RF-port (806) (Reverse Flow Port), and a diverter valve (808) that determines the flow path through the two-way valve. Diverter valve (808) is associated with housing (800) by valve rod (810) which is rotatably associated with housing (801). Preferably, valve rod (810) is spring loaded to bias diverter valve (808) closed and preventing flow through input (802). In forward flow conditions, the valve rod (810) rotates allowing fluid flow though the valve from the input (802) to the FF-port (804) while sealing off RF-port (806). In reverse flow conditions, the two-way valve (800) switches states and allows flow from the FF-Port (804) to the RF-Port (806). In reverse flow conditions, the spring bias causes valve rod (810) to rotate in the clock-wise direction sealing input (802) while opening RF-Port (806).

For the preferred embodiment, the two-way valve (806) is positioned at the input of the smart box (10) with the two-way valve input (802) associated with utility service line (20) and the FF-port (804) associated with the first flow control element. The RF-port (806) is associated with an accessory pathway to allow dumping. For such a configuration, in forward flow conditions, the two-way valve allows flow from utility service line (20) to the first flow control element. In reverse flow conditions, the diverter valve changes states and prevents flow from the FF-port to the utility service line (20) but allows flow from the FF-port to the RF-port which is associated with accessory pathway (200). A release valve (200) may be associated with the RF-port to set the amount of backflow pressure required before allowing backflow. One of ordinary skill in the art will appreciate that such a configuration prevents the smart box (10) from creating a "closed" system.

Box Insert

Figure 11A:
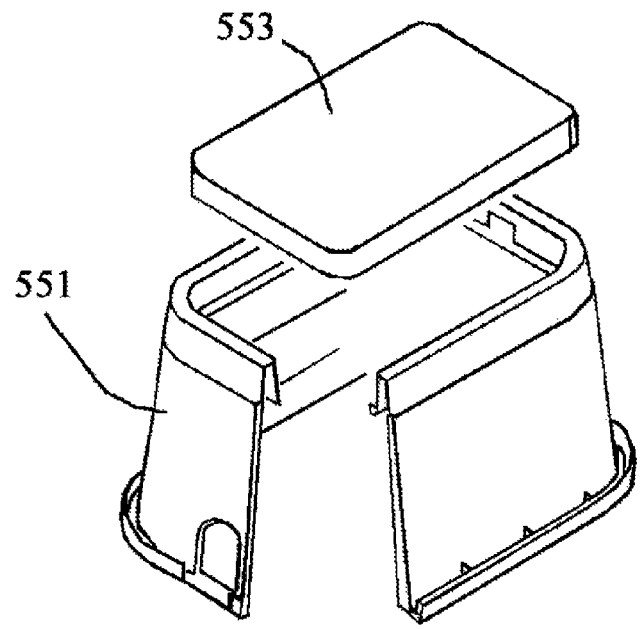
FIG. 11a depicts a prior art meter box including a partial cut away section.
Figure 11B:
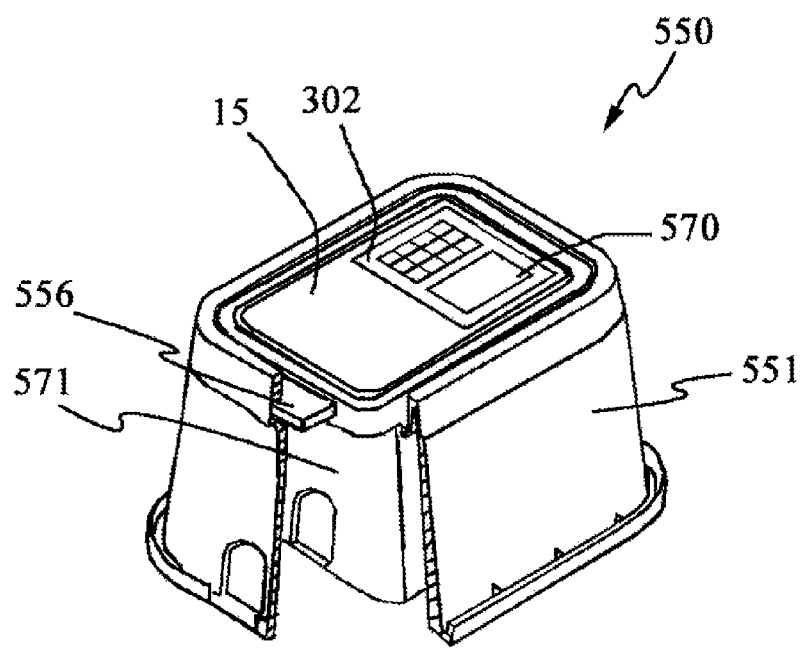
FIG. 11b depicts an embodiment of the invention comprising a smart box housing configured for being inserted inside a prior art meter box.
Figure 12:
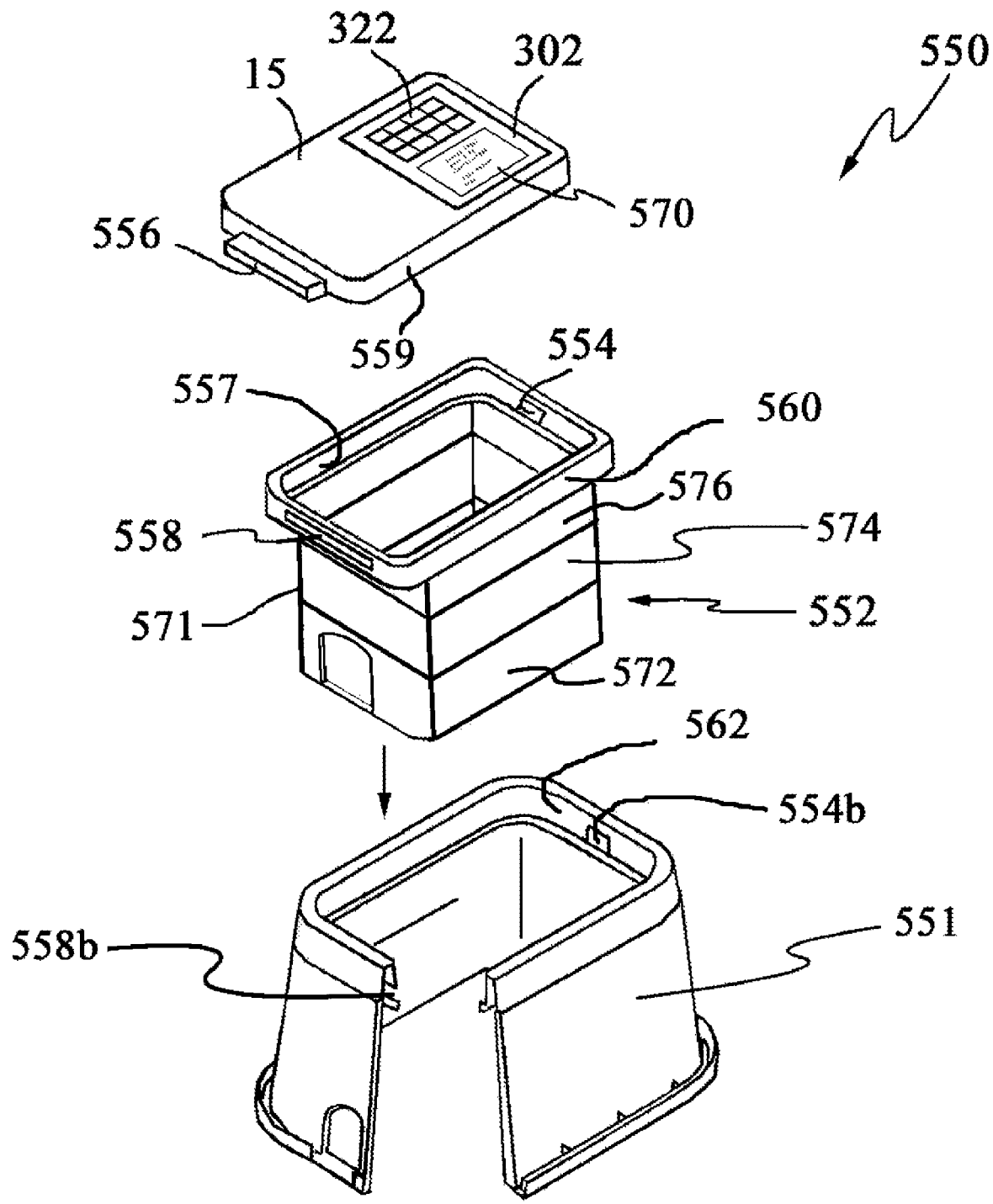
FIG. 12 is an exploded view of the smart box shown in FIG. 11b.

Yet another exemplary embodiment of the invention is depicted in FIG. 11b where a smart box (550) according to certain aspects of the invention is presented. Smart box (550) comprises a smart box housing (571) appropriately sized to fit inside prior art meter box (551) of FIG. 11a. FIG. 12 depicts an exploded view of the smart box (550) shown in FIG. 11b. For the preferred embodiment, housing (571) comprises a top ring (560) associated with a housing base (552). Housing base (552) comprises sections (572), (574), and (576) configured in a telescopic arrangement to allow the height of housing (571) to be adjusted to fit within a plurality of prior art meter boxes. It should be appreciated that any number of housing sections may be used as well as fixed height housings without departing from the scope and spirit of the invention. Additionally, smart box (550) is also preferably configured for use in a stand alone installation where there is no prior art meter box (551) present.

Top ring (560) has outer dimensions substantially equal to the outside dimensions of top (553) of FIG. 11a so that top ring (560) may be received by ring-socket (562) of prior art meter box (551). For this embodiment of the invention, top ring (560) comprises a slot (558) and slot (554) with such slots positioned within top ring (560) so that they are substantially adjacent to prior art slot (558b) and slot (554b) respectively when housing (571) is inserted into prior art meter box (551) as shown in FIG. 11b.

For the embodiment shown in FIG. 12, top 15 comprises electronic module (302) configured with an EM energy converter (322) and display (570). For this embodiment of the invention, the electronic module (302) and communication housing (305) are disposed in top 15. Electronic module (302), EM Energy Converter (322) display (570) and communication housing (305) will be described in more detail later in this document. Top 15 further comprises insert (556) configured for being inserted through slot (558) and slot (558b). Electronic module (302) further comprises an electronic lock comprising a plunger configured to slide through slot (554) and slot (554b). The electronic lock and insert (556) secure top (15) to housing (571) and meter box (551).

Alternatively, electronic module (302) may be a separate housing that is attached to the side of the smart box (10) enclosure or a prior art enclosure.

Meter Setter

Referring now to FIG. 13, a water meter setter comprising a sensor housing, flow control component, bypass-stabilizer line, and output line is shown. Water enters smart box (600) through input (601), flows through quick connector (602), through sensor housing (603), through input line (604), and into flow control component (90). Flow control component (90) comprises backflow-prevention element (26) and shutoff-valve (24). For the present embodiment, shutoff-valve (24) has three states; (a) off state, (b) bypass-state where resource flow is directed to bypass-stabilizer line (606), and (c) meter-state with resource flow directed to the input of meter (19).

It should be appreciated that the setter configuration may be altered without departing from the scope and spirit of the invention. For example, flow control component (90) may be relocated to a position between quick connector (602) and input (601) and sensor housing (603) may be relocated to output line (607). Also, one of ordinary skill in the art will note that quick connector (602) will provide a shutoff function when the male part of quick connector (602) is removed from the female part of quick connector (602).

When shutoff-valve (24) is in the off state, there is no flow through smart box (600). When shutoff-valve (24) is in the bypass-state, flow is directed through bypass-stabilizer line (606) to flapper connector (610) and then through meter output line (607) where it exits smart box (600) through output (612). One of ordinary skill in the art will appreciate that when shutoff-valve (24) is in the bypass-state, resource flow is not being metered by meter (19).

When shutoff-valve (24) is in the meter-state, resource flow from the input of flow control component (90) is directed to meter input quick connector (608). The resource flows through meter (19), through meter quick output connector (614) to flapper connector (610) and then through meter output line (607) where it exits smart box (600) through output (612). One of ordinary skill in the art will appreciate that when shutoff-valve (24) is in the meter-state, resource flow is being metered by meter (19).

For the embodiment of the invention shown in FIG. 13, bypass-stabilizer line (606) serves a dual purpose. First, bypass-stabilizer line (606) provides a more ridged association between input side (620) and output side (622) thereby providing a more consistent distance between input quick connector (608) and output quick connector (614). For the preferred embodiment shown in FIG. 13, the input side (620) includes input quick connector (602), sensor housing (603), input line (604), flow control component (90), and meter input line (605). Similarly, the output side (622) includes meter output line (607m), flapper connector (610), and output line (607). Such a ridged meter setter configuration is desirable as it simplifies installation of a meter as relative movement between meter input quick connector (608) and meter output quick connector (614) is minimized.

For additional stabilization, meter input line (605) and meter output line (607m) are mechanically associated with rings (624). Rings (624) are configured to receive a length of pipe or other round/long object. Such pipe extends through rings (624) along the bottom of smart box (600) (or ground/similar surface if smart box (600) has no bottom). Such a configuration minimizes twisting of the meter setter within smart box (600).

Second, bypass-stabilizer line (606) allows meter (19) to be removed from the smart box (600) without disrupting resource flow to a customer. When flow-shutoff-valve (24) is in the bypass state, resource flow is diverted from meter (19) and through bypass-stabilizer line (606) allowing meter (19) to be removed from smart box (600) by disassociating male (632) from female (630) of the meter input quick connector (608) and the meter output quick connector (614). Similarly, the entire meter setter can be removed from smart box (600) by separating the male/female components of quick connector (602) and quick connector (640). One of ordinary skill in the art will appreciate that such a configuration allows meter (19) or the entire meter setter to be removed from smart box (600) without the use of tools. It should be appreciated that embodiments where flow control component (90) is position between quick connector (602) and input (601) fall within the scope of the present invention as noted previously.

Attention is now directed to flapper connector (610). When resource flow is flowing through meter (19) flatter (642) is pressed against surface (646) thereby providing a high resistance to flow into bypass-stabilizer line (606) and providing almost no resistance to flow to output line (607). Similarly, when resource flow is flowing through bypass-stabilizer line (606) and not through meter (19), flapper (642) is pressed against surface (644) thereby providing a high resistance to flow into meter output line (607m) and providing almost no resistance to flow to output line (607). It should also be appreciated that flapper connector (610) helps prevent backflow from output (612) and into the output of meter (19). Embodiments were flapper connector (610) is replaced by a simple three way connector, a check valve assembly or a combination there of fall within the scope of the present invention.

The register of meter (19) and flow control component (90) are electrically associated with sensor housing (603) through cable (349) and cable (348) respectively. Sensor Housing (603) is further electrically associated with electronic module (302) as described below. Additionally, Sensor Housing (603) may be configured to house all or part of electronic module (302).

The meter setter depicted in FIG. 13 comprises several 90 degree turns. Such turns are typically avoided as they are known to add head loss to a system as well as have a negative impact on metering accuracy. To minimize such issues, the meter setter may be reconfigured to eliminate as many 90 degree terns as possible. Alternatively, the 90 degree turns may have a bigger diameter compared to the straight sections of pipe.

I should be appreciated that the meter setter installed in a smart box insert may be configured with essentially all the hardware necessary to associate a customer service line to a utility service line. For such a configuration, the old metering and pipe setter materials are removed from the prior art meter box. The smart box insert with the disclosed meter setter is inserted into the prior art box and with the utility service line being mechanically associated with the smart box input and the customer service line being associated with the smart box output.

Electronic Components

Attention is now directed to FIG. 14a. FIG. 14a depicts a side cut away view including a phantom view of a smart box comprising an electronic module and associated electronic components according to one exemplarily embodiment of the invention. For the embodiment of the invention shown in FIG. 14a, box (10) comprises body (14) defining a cavity (17) divided into first section (38) and second section (40) by wall (36a). Top (15) comprise top section (15a) that is movably associated with box (10) as top section (15a) can be removed from box (10) and top section (15b) that is movably associated with box (10) via pivot point (26b). Flow control components (described earlier) are disposed within second section (40) with a meter shown disclosed in first section (38). It should be appreciated that the various items depicted in FIG. 14a (or any image) are not necessarily drawn to scale unless otherwise stated.

Box (10) further comprises the electronic components outlined by dashed-box (300) which includes electronic module (302) electrically associated with selected flow control components and environment sensor (301) through cable (348) and a metering element/environment sensor (303) through cable (349). Electronic module (302) may further be electrically associated with other electronic devices disposed within cavity (17) via a communication/power buss provided by electronic module (302).

Figure 15:
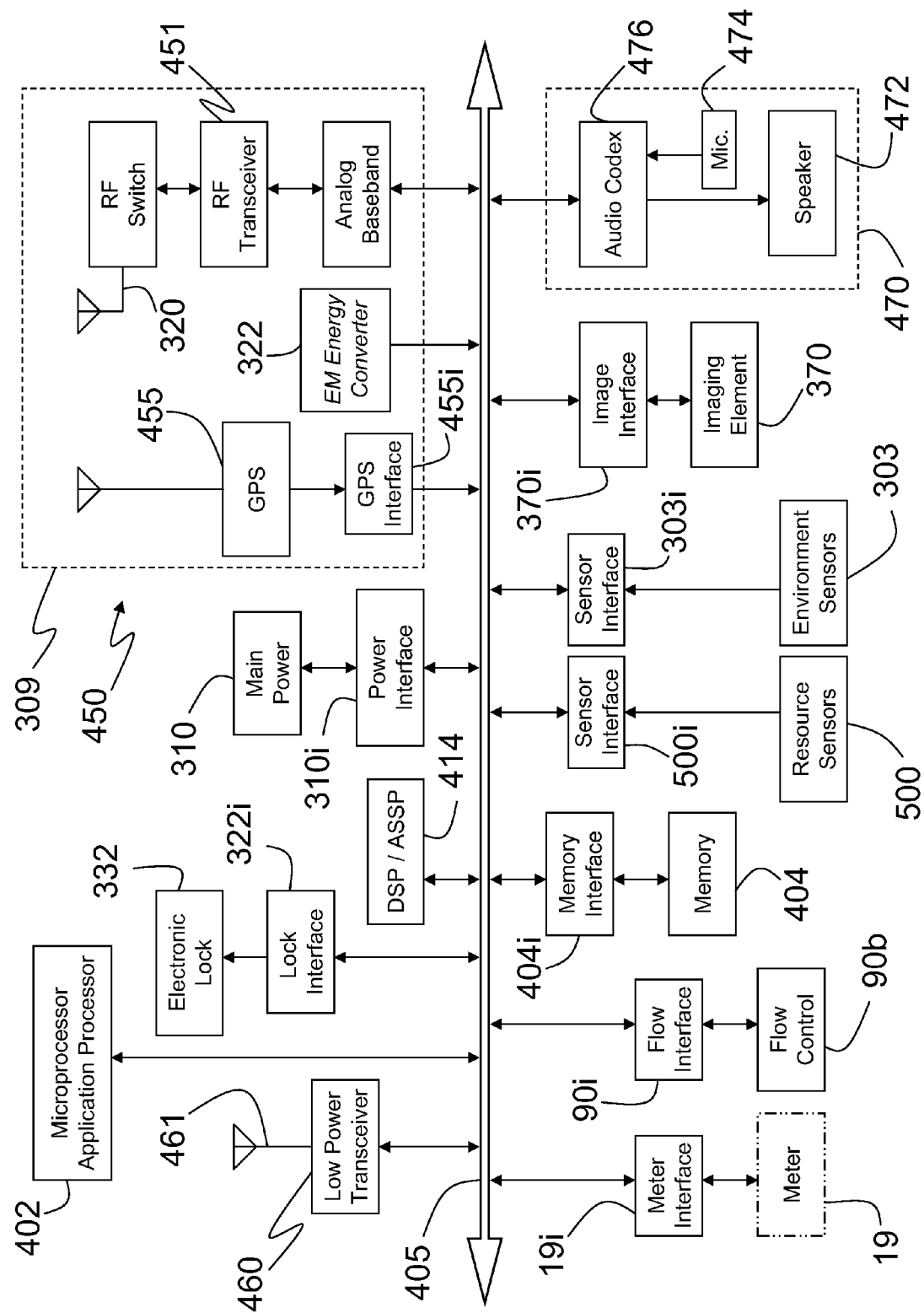
FIG. 15 is a block diagram representation of the various components of one embodiment of meter box (10)
Figure 15B:
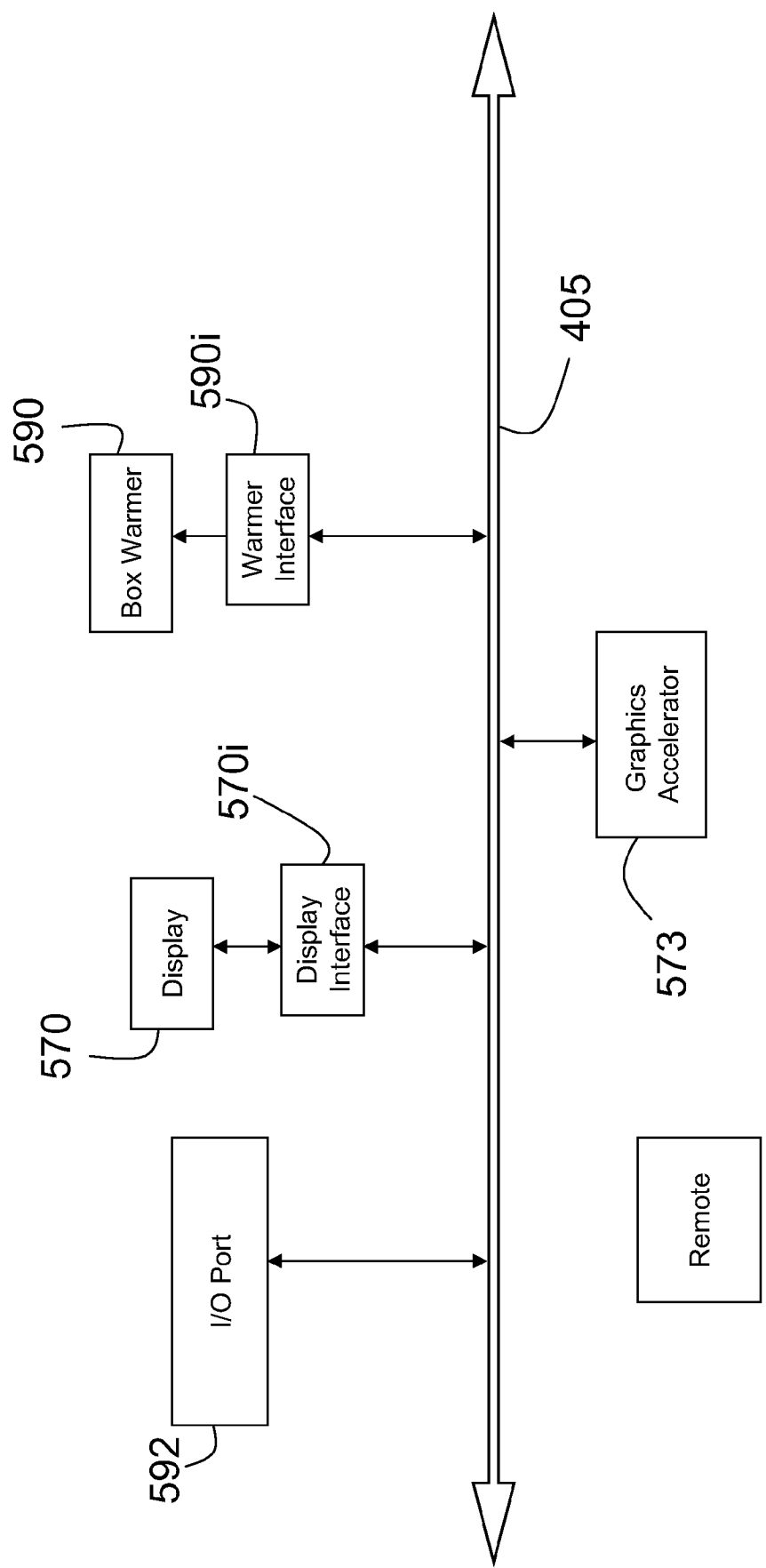
FIG. 15b is a continuation of the block diagram depicted in FIG. 15.

Referring now to FIG. 14b, a close up view of dashed-box (300) depicted in FIG. 14a is presented. Electronic module (302) includes a circuit board (306) mechanically associated with electronic module (302) housing by standoffs (311). Disposed on circuit board (306) is a processing device (402) electrically associated with a memory (404) (FIG. 15). A communication housing (305) is provided and comprises a radome section (309) configured to rest on top of and substantially adjacent to top (15). Depending base (307) extends from radome section (309) through top (15) and is mechanically associated with electronic module (302) so that electronic module (302) is positioned just under top (15) and substantially adjacent to top (15) although other orientations may be used. Top (15) may further comprise fasteners (301) configured to releasably but securely associate electronic module (302) with top (15). It will be appreciated that embodiments where communication housing (305) is disposed within top (15) fall within the scope of the present invention. Similarly, embodiments where the electronic module (302) housing is integral to top (15) fall within the scope of the invention. Additionally, the system may be configured so that radome section (309) housing all the electronic components of the system.

Electronic lock (332) is electrically associated with circuit board (306) through lock connection (333). Electronic lock (332) comprises plunger (334) configured to mechanically associate with slot (330) of top grove (15c). Plunger (334) slides in the UL (UnLock) direction to release top grove (15c) and slides in the L (Lock) direction to secure top grove (15c) to box (10). Electronic lock (332) selectively moves plunger (334) in either the L or UL direction in response to control signals received from processing device (402) or other devices electrically associated with buss (405). Alternatively, electronic lock (332) may be a simple magnetic lock comprising a magnetically responsive plunger (334) that slides in the L or UL direction in response to a magnetic element that is placed in the area (335) and moved in the L or UL direction.

For the embodiment of the invention shown in FIG. 14a and FIG. 14b, internal wall (36a) is stationary and comprises a wall post (345) that is received by post socket (346). Electronic lock (342) comprising plunger (344) and is electrically associated with processing device (402) through connection (340) and buss (405, FIG. 15) described later. Electronic lock (342) selectively moves plunger (344) in either the L or UL direction in response to control signals received from processing device (402) or other electronic devices electrically associated with buss (405). Plunger (344) slides in the L direction and extends through slot (344b, FIG. 14c) in wall post (345) and a corresponding slot in post socket (346) securing wall post (345) to post socket (346) preventing top section (15b) from pivoting about pivot point (26b) thereby preventing access to second section (40). Plunger (344) slides in the UL direction to release the secure connection between wall post (345) and post socket (346) allowing top section (15b) to pivot about pivot point (26b) thereby providing access to second section (40). Alternatively, electronic lock (342) may be replaced by a clip for mechanically securing wall post (345) to post socket (346) with access to such clip provided within first section (38).

FIG. 14c presents a side perspective view of box (10) with a top section movably associated with a box body and with the top section partially open to reveal a wall post and associated communication/power connector. For the preferred embodiment, wall post (345) and post socket (346) further comprise a communication/power connector (347) configure to provide a releasable electrical association between the communication/power connector (347) and communication/power buss extension (405c). When top section (15b) pivots about pivot point (26b) separating wall post (345) from post socket (346), communication/power connector (345) releases its electrical association with communication/power buss extension (405c). When top section (15b) is closed and wall post (345) is received by post socket (346), communication/power connector (347) re-establishes its electrical association with communication/power buss extension (405c). Additionally, surface (351) is configured with a seal for providing a substantially waterproof seal between surface (351) and opposing surface (352) of electronic module (302).

Referring now to FIG. 14b and FIG. 14c, radome section (309) is configured for hosing communications board (308) which is configured for receiving communication circuitry (450, FIG. 15) that comprises at least one of transmitter circuitry and receiver circuitry. For the preferred embodiment, communications board (308) comprises transceiver (451, FIG. 15) which is electrically associated with processing device (402) via wired connection (316). An antenna (452, FIG. 15) electrically associated with communication circuitry (450) is disposed within radome section (309) and is configured for transmitting a data signal (320) to a remote receiver. For the preferred embodiment, wired connection (316) is an extension of buss (405) described later which may comprise both data and power connections; however, other connection (316) configurations that comprise only conductors necessary for the transfer of data between communication circuitry (450) and processing device (402) fall within the scope of the invention. Additionally, while wired connections are shown, such connections may be replaced with wireless RF based communication technology such as Bluetooth. It should be noted that transmitter circuitry (450) and antenna (452) represent one possible embodiment of a data-transfer-facilitator configured for transmitting a data-signal to a remote receiver.

Antenna (452) is electrically associated with communication circuitry (450) and may be a trace antenna disposed on transmitter board (308), an antenna element mechanically associated with transmitter board (308) or an antenna element disposed within radome section (309) and electrically associated with transmitter (420). At least a portion of radome section (309) is substantially RF transparent to facilitate improved transmitted signal strength.

Radome housing (309) further comprises EM Energy Converter (322) associated with a portion of the outer sides of radome housing (309). EM Energy Converter (322) is configured to convert EM energy (350) (such as a radiated RF signal from a man made transmitter, sunlight, etc.) into a voltage for supplying power to system components and/or supply energy to a power source. One well known EM Energy Converter is a photovoltaic cell. One or more EM Energy Converter (322) sections are electrically connected in series and/or parallel as needed to supply the desired voltage and current characteristics. For the preferred embodiment, radome housing (309) comprises four photovoltaic sections connected in series with each section supplying about 1.5 volts for a total output of about 6.0 volts (no load). A diode is placed in series with the positive output side of EM Energy Converter (322) to prevent reverse power drain (anode connected to positive output with cathode providing an output connection). The output of EM Energy Converter (322) is electrically associated with communication board (308) through conductors (324) and is further electrically associated with power interface (322i, FIG. 15). For such configuration, EM Energy Converter (322) may supply a charging current to power source (310) and/or power selective of communication circuitry (450), processing device (402) as well as other electronic components electrically associated with buss (405).

Box (10) further comprises imaging element (370) and (372) electrically associated with processing device (402) through buss (405). Imaging element (370) is configured to provide images of items disposed within first section (38) while imaging element (372) is configured for providing images of items disposed within second section (40). For the preferred embodiment, imaging element (370) provides images of meter (19). When meter (19) comprises a register (19r) with a mechanical readout as showed in FIG. 14a, imaging element (370) is positioned to provide images showing a readout value generated by such water meter register. Similarly, imaging element (372) is positioned to provide images of flow control components disposed in second section (40).

Block Diagram

Attention now is directed to FIG. 15 which presents a block diagram representation of the various components for one embodiment of a smart box. For the preferred embodiment, the various functional blocks of FIG. 15 represent ASSPs (Application Specific Standard Product) although one or more blocks may be integrated into ASSP chip sets. Manufactures of such devices include Motorola, and Texas Instruments. While most of the functions are preferably performed by ASSP chip sets, Complex Programmable Logic Devices (CPLD) may be used to interface the various ASSP blocks to system buss (405) allowing one system component to interface with another component. Manufactures of suitable CPLD devices include Lattice's (ispMACH 4000 family) and (Altera's MAX 7000-series CPLD).

For the present embodiment of the invention, processing device (402) is configured to perform various tasks including data management, data storage, data transfers, resource monitoring, and system monitoring. For the preferred embodiment, processing device (402) is a microprocessor that supports standard operating systems and application software although other more/less powerful processing devices may be used such as ASICs (application specific integrated circuit) or ASSPs (application specific standard product). Processing device (402) may comprise onboard ROM, RAM, EPROM type memories. Processing device (402) is electrically associated with buss (405).

Buss (405) is configured for providing a communication path between the various electronic devices electrically associated with buss (405). For example, Buss (405) is configured for transferring data signals between processing device (402) and other electronic devices electrically associated with said buss (405). For the preferred embodiment, bus (405) also comprises electrical paths for transferring power between main power (310), EM power converter (322) and other electronic devices electrically associated with buss (405). Buss (405) my further comprise a data port and or a power port configured for supplying/receiving power or providing a communication path to electronic devices electrically associated with such port.

Memory (404) is electrically associated with buss (405) via memory controller (404i). Memory (404) may be any type of memory suitable for storing data such as flash memory, SRAM memory, hard drive memory, as well as other types of memories. Volatile memory continuously connected to a power source may be used, although, for the preferred embodiment, memory (404) is nonvolatile memory. Memory (404) may be used for storing all types of data including application programs, image data, sound data, resource consumption data, sensor data, and warning-criteria. Memory (404) is electrically associated with processing device (402) via memory controller (404i) and buss (405).

DSP/ASSP (414) is electrically associated to processing device (402) via buss (405). DSP (414) is configured to perform signal processing tasks such as voice, audio, video, encoding, decoding as well as other data and signal processing functions.

Display (570) is configured for displaying the various smart box (10) data. Display (570) is electrically associated with buss (405) through display interface (570i) which comprises a customizable touch screen controller configured for control and decoding functions for display (570). For the preferred embodiment display (570) is a LCD display configured with touch screen functionally. Additionally, display (570) has a "memory" configured to provide an image when power is removed from the display. For this embodiment, an image is written on the LCD display and when power is removed, the display will retain the image virtually indefinitely. Such a LCD display uses a technique developed by Zenithal Bistable Devices (ZBD), which adds a finely ridged grating to the inner glass surface of an LCD cell of Super-Twist-Nematic (STN) construction. As is known in the art the presence of the grating "latches" the polarization state of the liquid crystals and retains it when power is removed.

Smart box (10) my further comprise a graphics accelerator (573) that provides support for megapixel cameras and 3D graphics applications. One suitable graphics accelerator is the MQ2100 manufactured by MediaQ.

For the preferred embodiment, meter interface (19i) is disposed on circuit board (306) and is configured to receive data from a plurality of meters employing any one of a plurality of possible communication protocols. For the preferred embodiment, all communication protocols used by meters to be supported by in box (10) are programmed into meter interface (19i) which is configured to automatically select the correct protocol required to communicate with meter (19). The U.S. patent Byford et al. U.S. Pat. No. 5,523,751, filed on Apr. 22, 1994, issued on Jun. 4, 1996, claiming priority to Great Britain patent Application No. 9308380.6 filed Apr. 22, 1993 presents one embodiment of such a meter interface. U.S. patent Ayala et al. U.S. Pat. No. 5,619,192, filed on Jun. 14, 1994 and issued on Apr. 8, 1997, presents another embodiment of such a meter interface. Such references are incorporated by this reference for all that they disclose. Meter interface (19i) is electrically associated with electronic module (302) via cable (349). As noted earlier, cable (349) may be an extension of buss (405) which may include the traditional three conductor communication buss employed by legacy meters as described in the above identified references.

For the preferred embodiment, processing device (402) is configured to receive meter-data from utility meter (19) electrically associated with processing device (402). Processing device (402) is further configured to perform data-functions using at least part of the received data. Such data-functions include (a) transmitting at least part of said meter-data to a remote receiver, (b) storing said meter-data using memory (404) or onboard memory, and (c) performing data-management routines. Additionally, where meter (19) comprises a transmitter, computing device (402) may be configured to transfer data to meter (19) where meter (19) transmits at least part of such data to a remote receiver.

Box-warmer (590) is electrically associated with processing device (402) through box-warmer interface (590i) and buss (405). For the preferred embodiment, box-warmer (590) comprises a water tight housing comprising an outer area surrounding a fuel compartment. Box-warmer (590) is shaped as desired for being disposed at a desired location within cavity (17). Box-warmer (590) is configured to generate heat in response to control signals received over buss (405).

For the preferred embodiment the box-warmer (570) housing comprises an outer area surrounding a fuel compartment. The outer area is filled with a material that absorbs heat generated in the fuel compartment and releases such heat relatively slowly. The fuel compartment comprises exhaust ports and air intake ports that interface with corresponding ports in the outer area. Such ports extend throughout the outer area in a catacomb fashion and eventually extend beyond the outer area to an exhaust/intake point located a predefined distance from the outer area. For the preferred embodiment, such ports may be selectively opened and closed a desired amount by signals received from processing device (402). Box-warmer (590) is positioned within box (10) so that the exhaust/intake point is located near top (15). The fuel compartment houses a replaceable fuel cell containing a solid fuel such as trioxane and esbit although other heat sources may be used.

One of ordinary skill in the art will appreciate that box-warmer (590) may be installed in areas where the temperature drops to levels that may damage the components of smart box (10). For example, processing device (402) may receive sensor signals indicating that the temperature of meter (19) is low enough to freeze meter (19) thereby damaging components of meter (19). In response, processing device (402) transmits a signal to box-warmer (590) to activate box-warmer (590). The box-warmer (590) fuel cell activates and generates heat that is absorbed by the outer area surrounding the fuel compartment. The outer area then radiates such heat into smart box (10). Other heat sources may be use such as an electrical coil connected to a power source.

Communication circuitry (450) comprises transceiver (451) that is configured to transmit a data signal to a remote electronic device. It should be noted that embodiments where communication circuitry (450) comprises only a transmitter fall within the scope of the invention. For the preferred embodiment, transceiver (451) comprises a relatively low power transmitter that transmits a data signal in an unlicensed frequency band although transmitter circuitry (450) may comprise any number of well known technologies for wireless communications transmitting at any legal power level. For example, communication circuitry (450) may be configured to communicate over GPRS, GSM, GPRS, 3G, and EDGE enabled networks as well as WAP networks. It should be noted, however, that lower transmitter power levels are desired to minimize the strain on the power source.

To facilitate remote access to the smart box (10), a networking system, such as a local area network (LAN) may be utilized. In the preferred embodiment, such processing device (402) and memory (404) are configured to form a TCP/IP protocol suite and an HTTP (HyperText Transfer Protocol) server to provide two-way access to the smart box (10) data. Such TCP/IP protocols and HTTP server technology are well known in the art. For such an embodiment, the electronic module (302) include an HTTP server and a TCP/IP protocol stack. A gateway is provided that enables continuous remote access to the smart box (10).

Generally speaking, a gateway may simply be a means for connecting two already compatible systems. Alternatively, a gateway may be a means for connecting two otherwise incompatible computer systems. For such an alternative configuration, the TCP/IP protocol suite may be incorporated into a gateway serving multiple smart box (10) devices via a wired or wireless two-way network using, for example, Wireless Fidelity (Wi-Fi) technology. Such a gateway may incorporate an HTTP server for accessing data from multiple smart box (10) devices and for transmission of data to individual smart box (10) devices.

In the above described TCP/IP enabled smart box (10) systems, a remote transceiver provides access to a first network operating in accordance with a predetermined protocol (TCP/IP is one example). A plurality of smart box (10) devices may comprise a second network, such as a LAN. A gateway operatively couples the first network to the second network. Finally, an HTTP server is embedded in either the gateway or the plurality of smart box (10) devices facilitating the transfer of data between the two networks. With such a configuration, one of ordinary skill in the art will appreciate that individual smart box (10) devices or groups of smart box (10) devices may be accessed as if the smart box (10) devices were a web site and their information could be displayed on a web browser.

For the presently preferred embodiment of the invention, smart box (10) includes a GPS device (455) that is electrically associated with processing device (402) via buss (405) and GSP Interface (455i). GPS (455) is one embodiment of a location-detector electrically associated with a processing device where GPS (455) is configured to generate location-data for the location of electronic module (302).

Main power (310) is a long life depletable power source such as a Li Ion battery. For the preferred embodiment, main power (310) comprises at least one long life rechargeable Li Ion battery such as the ones manufactured by A123 Systems®. As shown in FIG. 14b, electronic module (302) is configured with one ore more power modules that are electrically connected in either series or parallel to achieve the desired voltage level or current capacity characteristics.

Extending the life of main power (310) is one design concern addressed by power interface (310i) which is configured to perform power management functions for the system as well as monitor the status of main power (310) and report such status to devices electrically associated with buss (405) (such as processing device (402)). Power interface (310i) dynamically addresses power management issues by selectively powering down unutilized devices. For the Preferred embodiment, power interface (310i) is a CPLD that generates chip-select signals and powers down the various ASSPs as desired.

Electronic lock (332) is electrically associated with processing device (402) through lock interface (332i) and buss (405). Lock interface (332i) is an ASSP or CPLD device configured to change the state of electronic lock (332) in response to control signals received from processing device (402). Similarly, for the preferred embodiment, lock interface (332i) is configured to communicate the status of electronic lock (332) to devices electrically associated with buss (405). It should be appreciated that such description equally applies to electronic lock (342).

Flow control component (90b) is electrically associated with processing device (402) via flow interface (90i) electrically associated with buss (405). For this embodiment of the invention, the controller (140) functions are performed by flow interface (90i).

Flow Interface (90i) is an ASSP or CPLD device that is configured to monitor and report the status of electronic shutoff (92) as well as selectively change the state of electronic shutoff (92) in response to control signals received from processing device (402) via buss (405). For this embodiment, power is supplied to electronic shutoff (92) over buss (405).

Flow interface (90i) is also configured to monitor the status of backflow-prevention element (26). When the electronic sensor associated with flapper (72) indicated that such flapper is engaged (as described above) and preventing reverse flow, flow interface (60i) generates a reverse-flow signal. Processing device (402) is configured to detect such reverse-flow signal and perform various tasks as described later.

Flow interface (90i) is further configured to monitor flow detector (110) comprising spinner (113), magnetic detector (115), and a direction-indicator (120). Flow interface (90i) is configured to detect the output of magnetic detector (115), monitor the direction of rotation as defined by direction-indicator (120) and maintain a count of the number of spinner (113) rotations and the direction of spinner (113) rotations. Flow interface (90i) is configured to transfer such spinner data to processing device (402) upon receiving a data request from processing device (402) or at periodic, random, or user predefined intervals and times.

Imaging element (370) is electrically associated with processing device (402) through image interface (370i) and buss (405). Imaging element (370) and image interface (370i) are configured for acquiring and transmitting images to electronic devices electrically associated with buss (405). For the preferred embodiment, imaging interface (370i) is configured to support CMOS image input sensors such as the one manufactured by Micron® and/or CCD (charge-coupled device) image input sensors such as the ones manufactured by ATMEL® sensors. Imaging interface (370i) performs the necessary processing functions to convert the imaging data into a desired format before transferring such data to other devices associated with buss (405). The preceding description of imaging element (370) equally applies to imaging element (372).

Low Power transceiver (460) comprises a low power transmitter relative to transceiver (451) and operates in an unlicensed band although frequencies requiring a license may be used. Suitable technologies include Bluetooth and Zigbee (IEEE 802.15). Zigbee is a low data rate solution for multi-month to multi-year battery life applications. Zigbee operates on an unlicensed, international frequency band. Such technologies are known and understood by those skilled in the art, and a detailed explanation thereof is not necessary for purposes of describing the method and system according to the present invention. Antenna (461) may be a dual diversity antenna system with one antenna disposed on circuit board (306) and a second antenna disposed in radome housing (309).

For the preferred embodiment, audio module (470) comprises speaker (472) and microphone (474) electrically associated with audio codex (476). Audio module (470) is configured for detecting sound waves and converting such waves into digital data of a predefined format such as MP3. Sound waves may also be generated by audio module (470) using speaker (473) to issue warnings and provide for other forms of communications. It should be appreciated by those of ordinary skill in the art that only microphone (474) is required to record sound data from the smart box (10) environment. Additionally, the audio module (470) configuration depicted in FIG. 15 may be used for voice communications between a person located at smart box (10) and a person located at a remote site using, for example, VoIP for the IP enabled systems describe earlier.

Figure 16:
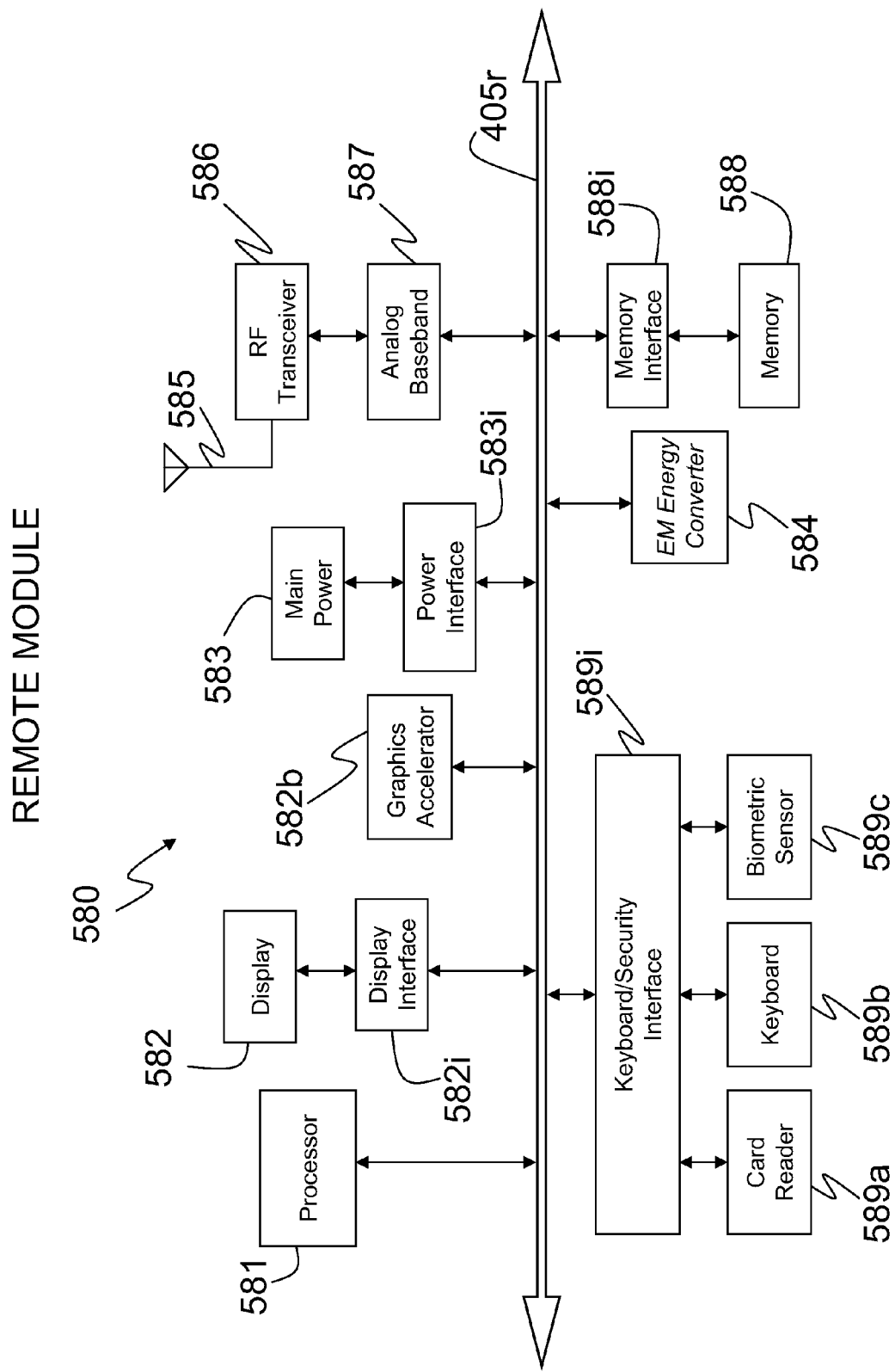
FIG. 16 is a block diagram representation of a remote module.

Attention is not directed to FIG. 16 which depicts a block diagram representation of a remote module (580). Remote module (580) is configured for being installed at a remote location from smart box (10). For example, remote module (580) is configured for being installed in a customer home. Remote module (580) is configured to receive and transmit data to smart box (10). Using remote module (580) a customer may perform many functions including monitoring resource usage, receive warnings such as leak warnings, temperature warnings (freeze), receive billing information, enter payment information for ordering a unit of resource and paying a monthly bill, and turn off/on various smart box (10) components.

Remote Module (580) comprises processor (581) electrically associated with buss (405r). For the present embodiment of the invention, processing device (581) is configured to perform various tasks including data management, data storage, data transfers, resource monitoring, and system monitoring. For the preferred embodiment, processing device (581) is a microprocessor that supports standard operating systems and application software although other more/less powerful processing devices may be used such as ASICs (application specific integrated circuit) or ASSPs (application specific standard product). Processing device (581) may comprise onboard ROM, RAM, and EPROM type memories. Processing device (581) is electrically associated with buss (405*r*).

Buss (405*r*) is configured for providing a communication path between the various electronic devices electrically associated with buss (405*r*). For example, Buss (405) is configured for transferring data signals between processing device (581) and other electronic devices electrically associated with said buss (405*r*). For the preferred embodiment, bus (405*r*) also comprises electrical paths for transferring power between main power (583), EM Energy Converter (584) and other electronic devices electrically associated with buss (405*r*). Buss (405*r*) my further comprise a data port and or a power port configured for supplying/receiving power or providing a communication path to electronic devices electrically associated with such port. For example, buss (405*r*) may be electrically associated with an external network such as the internet. For such configuration, the remote module may be configured to provide billing data to a utility provider and/or authorize payment transactions.

Memory (588) is electrically associated with buss (405*r*) via memory controller (588*i*). Memory (588) may be any type of memory suitable for storing data such as flash memory, SRAM memory, hard drive memory, as well as other types of memories. Volatile memory, perhaps continuously connected to a power source may be used, although, for the preferred embodiment, memory (588) is nonvolatile memory. Memory (588) may be used for storing all types of data including application programs, image data, sound data, resource consumption data, sensor data, warning-criteria, biometric data and other user specific data. Memory (588) is electrically associated with processing device (581) via memory controller (588*i*) and buss (405*r*).

The teachings previously presented for main power (310) and power interface (310*i*) apply to remote module main power (583) and power interface (583*i*). It should be appreciated, however, that since the remote module (580) is located inside a customer home, remote module (580) may receive power from a power grid and/or main power (583).

EM Energy Converter (584) is associated with a portion of the outer sides of remote module (581). EM Energy Converter (584) is configured to convert EM energy (such as a radiated RF signal from a man made transmitter, sunlight, etc.) into a voltage for supplying power to system components and/or supply energy to a power source. One well known EM Energy Converter is a photovoltaic cell. It should be appreciated that EM Energy Converter (584) performs essentially the same function as does EM Energy Converter (322).

RF transceiver (586) may comprise a relatively low power transmitter that communicates with devices near the remote module (581) (such as smart box (10)) or a more power transmitter that is configured to communication with smart box (10) as well as other receives associated with an AMR system. For the preferred embodiment, RF transceiver (586) operates in an unlicensed band.

Graphics accelerator (582*b*) is an optional feature that may be useful in some smart box (10) and remote module (580) configurations. Graphics accelerator (582) is configured to support digital cameras and 3D graphics.

As with display (570), display (582) is configured for displaying information received from smart box (10), from the user, and from other sources. Display (582) is electrically associated with buss (405*r*) through display interface (582*i*) which comprises a customizable touch screen controller configured for control and decoding functions for display (582). For the preferred embodiment display (582) is a LCD display configured with touch screen functionally. Additionally, display (582) has a "memory" configured to provide an image when power is removed from the display (as previously described).

A card reader (589*a*), optional keyboard (589*b*) and Biometric sensor (589*c*) are electrically associated with buss (405*r*) via keyboard/security interface (589*i*). For systems not having touch screen functionally, option keyboard (589*b*) is used although both could be used. Interface/security interface (589*i*) provides control and decoding functions for card reader (589*a*), keyboard (589*b*) and Biometric sensor (589*c*).

Carder reader (589*a*) is a standard magnetic strip reader or smart card reader well known in the art. Using carder reader (589*a*), a customer can input payment information to purchase a desired amount of a resource and/or to pay a bill. The payment information may be stored in memory (588) so that re-entering of such information in future transactions is not necessary. When a purchase or payment transaction is desired, the payment information is transferred by processing device (580) to smart box (10) which transfers the information to the resource provider. Alternatively, the information may be transferred directly to the resource provider via communication with an AMR system.

Biometric sensor (589*c*) is used to keep the customers personal information secure using biometric identification. Biometric identification refers to the automatic identification of a person based on his/her physiological or behavioral characteristics. A biometric system is essentially a pattern recognition system which makes a personal identification by determining the authenticity of a specific physiological or behavioral characteristic possessed by a user. The biometric system may include, for example, a handwriting recognition system, a voice recognition system and fingerprint recognition.

For the preferred embodiment of the invention, biometric sensor (589*c*) is a fingerprint scanner. For this embodiment of the invention, a user initially places a finger on biometric sensor (589*c*). Biometric sensor (589*c*) scans the finger and transfers a digital representation of the user's fingerprint to memory (588). Such an initial bio sample is called an enrolment sample. After an enrolment sample has been stored in memory, future remote module (580) transactions are authorized by processing device (580) using biosensor (589*c*). For such a configuration, if a customer wishes to purchase a resource or pay a bill (for example), the customer first gains access to the remote module (580). To gain access, the customer places the appropriate finger on biosensor (589*c*). Biosensor (589*c*) takes a real time scan of such finger and transfers the real time bio sample data to processing device (580) or memory (588) or some other temporary memory. Processing device (580) compares the real time bio sample with the enrolment bio sample and makes a (match)/(does not match) determination. If the two samples match, the customer is allowed access to remote module (580). If the samples do not match, access is denied.

Attention is now directed to the various sensors that may be associated with smart box (10). Generally speaking, a sensor is a device that tells something about its environment typically using a transducer which converts a parameter at a test point to a form suitable for measurement by a sensor circuit.

Stated another way, a sensor is a device which is designed to produce a signal or offer an indication in response to an event or stimulus within its detection zone. An electronic sensor is a sensor that provides such information by creating an electrical signal. Electronic sensors are so numerous and diverse that describing all possible sensor types and associated parts that may be used would fill volumes and is beyond the scope of this document. Additionally, sensor technologies are known and understood by those skilled in the art, and a detailed explanation thereof is not necessary for purposes of describing the method and system according to the present invention.

Environment sensor (303) is electrically associated with processing device (402) through sensor interface (303i) and buss (405). Environment sensor (303) represents one or more electronic sensors configured for monitoring a particular attribute associated with box (10)'s environment. Such attributes include (a) a chlorine sensor that generates sensor signals indicative of the existence of chlorine gas, (b) a temperature sensor that generates a sensor-signal indicative of a measured temperature in the vicinity of the sensor, (c) water level sensor configured for generating sensor-signals indicative of the water level inside cavity (17), (d) a light sensor configured for generating sensor-signals indicative of the amount of light in the vicinity of the light sensor; and (e) a top open sensor configured for generating sensor-signals indicative of the opened/closed status of top (15). For the preferred embodiment, sensor interface (303i) is a CPLD configure to periodically scan (at random intervals, periodic intervals, or user defined intervals) the various sensors electrically associated with interface (303i) and transfer processed or unprocessed sensor signals to devices electrically associated with buss (405) (e.g. processing device (402)).

Resource sensor (500) is electrically associated with processing device (402) through sensor interface (500i) and buss (405). A sensor housing (603) is preferably disposed within second section (40) and is provided access to the resource flowing through box (10). For the preferred embodiment, the sensor housing is configured to house a plurality of sensor transducers and is disposed between the utility service line and the input of flow control component (90). Resource sensor (500) represents one or more electronic sensors configured for monitoring one or more attributes of a resource flowing through (or into) sensor housing (603). Sensor interface (500i) is configured to monitor the sensor signals generated by resource sensor (500) and provide processed or unprocessed sensor signals to devices electrically associated with buss (405) (e.g. processing device (402)). Examples of resource sensors include (a) pH sensor configured for generating sensor-signals indicative of a resource's pH level, (b) chlorine sensor configured for generating sensor-signals indicative the amount of chlorine in a resource, (c) pressure sensor configured for generating sensor-signals indicative of the pressure exerted by a resource, (d) turbidity sensor configured for generating sensor-signals indicative of the resource's turbidity, and (e) a particle counter.

Resource/Environment Monitoring Function

Various embodiments of the disclosed invention directed to resource and environment monitoring are now considered. As with the above examples, currently considered resource monitoring functions are directed to water monitoring. One goal of water monitoring is to verify that the chemical and physical properties of water supplied by a utility meet or exceed predefined criteria for the parameter being monitored including utility set criteria, regulatory criteria (e.g. EPA regulations and/or recommendations), and customer criteria. Such criteria may be represented by warning-criteria values stored in memory (404) as described later.

For the presently preferred embodiment, processing device (402) is configured to retrieve sensor data from sensor interface (500i) and (303i). Processing device (402) then performs data functions consisting of at least one of: (a) transferring at least part of the sensor data to a remote device; (b) storing real-time sensor data in a memory; (c) performing predefined statistical manipulation on the real-time sensor data to derive statistical sensor-data and storing such sensor-data in a predefined format, (d) defining historical data by storing time stamped data (statistically manipulated data and/or raw data) representing sensor data related to a predefined period of time in memory and (d) comparing sensor data to predefined warning-criteria and issues warnings when appropriate. Such data types and functions will be described in more detail later.

There are numerous electronic sensors available for continuous measurement of a plurality of parameters and chemical constituents, however, the three parameters of particular interest for the preferred embodiment are: pressure, temperature, and pH. Other parameters include specific conductance, dissolved oxygen (D.O.), and turbidity. It should be appreciated that sensors configured to measure only a single parameter may be used as well as sensors capable of measuring a plurality of parameters. One of ordinary skill in the art will appreciate that the sensor technology selected is based on several parameters including the size of smart box (10), cost, and user/application requirements.

One suitable multi-parameter water sensor probe is the Surtron 5600-0703 water quality probe which can be configured to provide a plurality of measurements including: Temperature (C/F), Specific Conductance (mS/cm), pH, Dissolved Oxygen (mg/l), Salinity (ppt), Turbidity (NTU), Ammonium(a) (mg/l-N), Nitrate (mg/l-n), Chloride (mg/l), Total Dissolved Gas (mmHg), Transmissivity, Ambient Light ($\mu$mol s-1 m-2), Chlorophyll ($\mu$g/l) and Global Positioning (GPS) Data. For the preferred embodiment, the resource sensor is electrically associated with an ASSP or CPLD configured to scan the resource sensor at predefined intervals as defined by a user for the parameter of interest and convert such sensor signals into resource sensor-data. Such sensor-data is then made available to electronic devices electrically associated with buss (405). Notably, sensor housing (603) may be modified as necessary to house the sensor of choice. In addition, for some embodiments, sensor accuracy is sacrificed in exchange for reducing the sensor housing (603) size. Additionally, a sensor housing separate from the smart box may be used. Such a sensor housing is placed in series with the utility service line, the smart box and the customer service line and is electrically associated with the smart box electronic module.

Similarly, embodiments of the disclosed invention concern monitoring environmental parameters for the smart box environment. As noted above, one or more environment sensors (303) may be electrically associated with processing device (402) through sensor interface (303i) and buss (405). Such environment attributes include (a) a chlorine sensor that generates sensor signals indicative of the existence of chlorine gas, (b) a temperature sensor that generates a sensor-signal indicative of a measured temperature in the vicinity of the sensor, (c) water level sensor configured for generating sensor-signals indicative of the water level inside cavity (17), (d) a light sensor configured for generating sensor-signals indicative of the amount of light in the vicinity of the light sensor; and (e) a top open sensor configured for generating sensor-signals indicative of the opened/closed status of top (15). For the preferred embodiment, sensor interface (303i) is a CPLD configure to periodically scan (at random intervals, periodic intervals, or user defined intervals) the various sensors electrically associated with interface (303i) and convert such sensor signals to digital data for storing in local memory and/or transferring such environmental sensor-data to devices electrically associated with buss (405) (e.g. processing device (402)).

Exemplary embodiments of the various environmental sensors that may be electrically associated with sensor interface (500i) are now considered. One suitable chlorine gas sensor is the Sixth Sense $Cl_2$ micro sensor. For this configuration, sensor interface (500i) is configured to receive sensor signals from the $Cl_2$ sensor and convert them in to a digital form. Such digital data may be stored a local memory or transferred to devices electrically associated with buss (405). It should be appreciated that the presence of $Cl_2$ gas in smart box (10) would be an indication of a leak.

As for detecting temperature, electronic temperature sensors have been available for years any number of which may be configured to be electrically associated with and provide sensor data to sensor interface (500i). Such temperature data would be made available to devices electrically associated with buss (405) such as processing device (402).

One embodiment of a water level sensor comprises a sensor attached to the inside of smart box (10) running vertically from the floor to top (15). Such sensor comprises a plurality of electrical contacts with each electrical contact positioned at a known vertical location along the sensor which is further associated with a smart box (10) depth. For example, where smart box (10) has a depth of twenty inches, the water level sensor is a sensor comprising twenty electrical contacts. Electrical Contact 1 would be located one inch from the bottom of smart box (10) while electrical contact 5 would be located five inches from the bottom of smart box (10) and electrical contact 20 would be located twenty inches from the bottom of smart box (10). A float is configured with a float-conductor that is electrically associated with a detection circuit. The float is configured to rise as the water level in the smart box rises. As the float rises, the float-conductor comes in electrical association with different contacts thereby defining the water level inside the smart box. Sensor interface (500i) is configured to sense such changes and determine the waster level in smart box (10).

As for suitable light sensors electronic light sensors have been available for years any number of which may be configured to be electrically associated with sensor interface (500i). Such sensor data may be used by processing device (402), for example, to determine when top (15) has been removed from the smart box (10).

Suitable top open sensors include any number of devices that can electrically signal the removal/opening of top (15). For one method, a magnetically sensitive switch is associated with the body (14) of smart box (10) with a corresponding magnetic element associated with top (15). When top (15) is opened or removed from smart box (10), the magnetic element is disassociated from the magnetic switch which signals the disassociation to sensor interface (500i).

Sensor Data

The various forms of sensor data are now considered. Embodiments of the invention may simply store real time or near real-time sensor data while other embodiments of the invention are configured to perform statistical manipulation on the real-time data (or near real-time data) and store the results in a historical/statistical format. One example of an historical/statistical format includes average values over a predefined period of time such as (a) a running average value, (b) a weekly average value, (c) monthly average value, or (d) yearly average value.

Using temperature as an example, processing device (402) may be configured to take a real time temperature reading of the resource flowing through sensor housing (603) and maintain a running average. The running average data value and most recent real time data value are then presented to a user via a transmitted RF data signal and/or display device (570) or other devices electrically associated with buss (405). For such data, a running total is maintained and a counter value is maintained so that the average value is the running total divided by the counter value. Any predefined period of time may be used limited only by the amount of historical data available.

Yet other example of an historical/statistical format includes storing an average temperature value (or any water attribute) for each day in a year. For example, over a five year period, processing device (402) may be configured to take a temperature reading five times a day and average the five readings to obtain an average water temperature reading for each day in the five year period (365 values per year or 1826 values for all five years assuming one leap year). When a real time temperature value for May $15^{th}$ is presented to a user, processing device (402) may be further configured to present the historical average temperature value for May $15^{th}$ over the past five years. Alternatively, processing device (402) could be configured to average the five historical values and present the five year historical average temperature value for May $15^{th}$.

For the preferred embodiment, a sample-period value and number-of-samples value is set by a user for the parameter of interest. For the above embodiment, the sample-period is one day and the number-of-samples is five for the temperature parameter.

Another example would be a sample-period of six hours and the number of samples could be 10. For this example, from 12:00 am to 6:00 am 10 temperature readings are taken and then averaged with the result stored in memory with a time stamp. Next, ten temperature readings are taken from 6:00 am to 12:00 pm and then averaged with the result stored in memory with a time stamp. The same is done for 12:00 pm to 6:00 pm and 6:00 pm to 12:00 am time periods. For the day May 15, 2001, a suitable time stamp would be 2001-05-15-1200-0600-10-60.2F. Note the first number set is the year, the second number set is the month, the third number set is the day, the fourth number set is the start time, the fifth number set is the stop time, the sixth number set is the number of samples and the seventh number set is the average value. Note that using a time stamp with the above described order allows such data can be placed in descending or ascending order using a simple sort routine. Although it should be appreciated that any time stamp order may be used.

Warning Criteria

Warning criteria is used by processing device (402) to determine when a monitored parameter indicates a warning to a user should be generate. For the preferred embodiment, pH warning criteria includes a max and a min pH value. When processor device (402) determines that a real-time (or near-real time) pH value is higher than the maximum or lower than the minimum value, a warning is issued. The warning may be transmitted to a remote receiver and/or displayed on display (570).

Other warning criteria may be specific to flow data retrieved from meter (19) or a flow sensor. As noted previously, certain embodiments of flow-control-component (90)

comprises a flow detector (110) comprising a spinner (113) and a direction-indicator (120). Such flow detector (110) generates electrical signals relatable to the amount of resource flow (and direction of flow) through flow-control-component (90) which is one example of flow-data. For the preferred embodiment, flow-data-warning-criteria are stored in memory (404). Such warning criteria includes: (a) no flow warning; (b) large leak warning; (c) leak warning; and (e) backflow warning.

The no flow warning criteria comprises a no-flow-time value and a minimum-flow-value. When the flow-data monitored by processing device (402) indicates that the resource flow through smart box (10) is equal to or lower than the minimum-flow-value over a predefined amount of time equal to or greater than the no-flow-time value, a no flow warning is issued. For example, assume the no-flow-time is 60 hours and the minimum-flow-value is 1 gallon. If the flow-data monitored by processing device (402) indicates that there has been 0.2 gallons of resource flow through smart box (10) over the last 60 hours, a no flow warning is issued. Such a condition might occur, for example, when meter tampering has occurred and the resource flow has been diverted around the components of smart box (10).

The leak warning criteria comprises a leak-time value and a maximum-continuous-flow-value. When the flow-data monitored by processing device (402) indicates that the resource flow through smart box (10) is equal to or granted than the maximum-continuous-flow-value over a predefined amount of time equal to or greater than the leak-time value, a leak warning is issued. It should be appreciated that people rarely use water continuously during the day. Thus, if flow data indicates that a user is continuously consuming water for a long duration in time, a leak warning is issued. In addition, processing device (402) may be further programmed to generate a shutoff signal that is transmitted to the electronic shutoff valve.

The large leak warning criteria comprises a large-leak-time value and a maximum-continuous-largeflow-value. When the flow-data monitored by processing device (402) indicates that the resource flow through smart box (10) is equal to or granted than the maximum-continuous-largeflow-value over a predefined amount of time equal to or greater than the large-leak-time value, a large leak warning is issued. This warning represents a more severe leak than the leak warning previously described. Thus, the large-leak-time value is preferably shorter than the leak-time value and the maximum-continuous-largeflow-value is preferably greater than the maximum-continuous-flow-value. For example, if processor determines that 20 gallons of water has been continuously used over a period of ten hours, and the maximum-continuous-flow-value is 15 gallons for ten hours, then a large leak warning is issued. In addition, processing device (402) may be further programmed to generate a shutoff signal that is transmitted to the electronic shutoff valve.

The backflow warning criteria comprises a backflow-time value and a backflow-amount value. When the flow-data monitored by processing device (402) indicates that the resource is flowing from the output of smart box (10) to the input of smart box (10) in an amount that is equal to or greater than the backflow-amount-value a backflow warning is issued. In addition, processing device (402) may be further programmed to generate a shutoff signal that is transmitted to the electronic shutoff valve. For example, assume a backflow-amount-value of 1 gallon. If processing device (402) determines that one or more gallons of water have back-flowed from the customer to the utility service line, a black flow warning is issued.

Attention is not directed to FIG. 17 which presents one exemplary display format for displaying smart meter box data. The exemplary display includes a customer number, address meter box location information, meter type and meter number information. Historical/statistical consumption data, pH level data, water temperature data, water pressure data and chlorine level data is presented along with real time data.

Exemplary methodologies for using the above described technologies will now be considered.

One presently preferred method of associating a residential water utility service line to a customer service line is disclosed. In such method, a meter box is provided comprising a body and a top cover where the top cover is movably associated with the body and the body defines a cavity configured for receiving a metering element. Next a flow control element comprising a body-input and a body-output is disposed at least partially inside the cavity. The body-input is associated with a water utility service line and the body-output is configured for being associated with the input of a water meter input. Next an output-connection is provided comprising a connection-input and a connection-output. The connection-input is configured to be associated with the output of a water meter and the connection-output is configured to be associated with a customer service line.

The next step in the method is providing a processing device electrically associated with a memory, at least one data-transfer-facilitator, and a power source. Such data-transfer-facilitator comprises at least one of (a) a transmitter configured for transmitting a data-signal to a remote receiver, (b) a receiver for receiving a data-signal transmitted from a remote receive, and (c) a communications interface configured for transferring data to an electronic device, such as a meter installed within the smart box. The processing device, memory, and data-transfer-facilitator may be separate components or components of an electronic module. The processing device is configured to use the data-transfer-facilitator to transfer sensor-data to a remote electronic device.

At least one sensor is provided where such sensor is disposed within the cavity and electrically associated the processing device. The sensor is configured for providing sensor-signals to the processing device. The at least one sensor is at least one of a chlorine sensor, temperature sensor, water level sensor, water pressure sensor, light sensor, release-valve sensor, and a door open sensor.

The memory is configured for storing warning-criteria. Warning-criteria comprise information used by a processing device to determine when a sensor signal indicates that a predefined condition has occurred. The processing device may be further configured to use the data-transfer-facilitator to receive a data signal from a remote electronic device comprising warning-criteria-update-information. The processing device may then update warning-criteria already stored in memory or establish new warning-criteria based on at least part of the warning-criteria-update-information.

The processing device is configured to monitor the various sensor-signals and issue a warning when the processing device determines said sensor-signals satisfy a warning-criteria condition. One example of such a sensor is a chlorine sensor that generates a sensor-signal indicative of the amount of chlorine detected in the vicinity of the chlorine sensor. The chlorine sensor may be disposed within a sensor housing which is provided access to the resource flowing through smart box (10).

Alternatively, the chlorine sensor may be disposed within the box cavity and configured for detecting chlorine inside the meter box. For such a configuration, the processing device is further configured to generate a leak-warning-signal when said the sensor-signal meets a predefined warning-criteria condition related to chlorine.

The next method considered related to a method of preventing back flow from the input of a water meter box to a water utility service line. The first step is to associate an electronic-shutoff valve with the resource input of a water meter box so that a resource flowing through the meter box must pass through the electronic-shutoff valve. The electronic-shutoff valve is then electrically associated a controller. Next a flow sensor is associated with the input of a water meter box and electrically associated with the controller. The flow sensor is configured to generate flow-signals related to the direction of water flow through the meter box input. The flow signals are monitored by a flow interface that converts such signals in a flow-data and transfers such flow-data to a controller. The controller is configured to generate a close-signal and transmit such close-signal to the electronic-shutoff valve when the flow-data indicates a back flow condition exists. The electronic-shutoff valve is further configured to close and prevent resource flow through the meter box when a close-signal is received from the controller.

The controller is further associated with a timing-device allowing the controller to measure the elapsed time after a close-signal is sent, said controller further configured to send a open-signal to said electronic-shutoff when said elapsed time reaches a predefined value.

Alternatively, a pressure sensor is provided at the input of the box and out the output of the box. Both pressure sensors are electrically associated with the processing device. When the processing device determines that the pressure at the input is lower than the pressure at the output, the processor generates a close-signal. After generating a close-signal due to pressure data, the processing device may be further configured to monitor the input and out pressures and generate an open-signal when the input pressure greater than the output pressure.

Attention is now directed to subject matter concerning methodologies according to various teachings of the invention.

Figure 18:
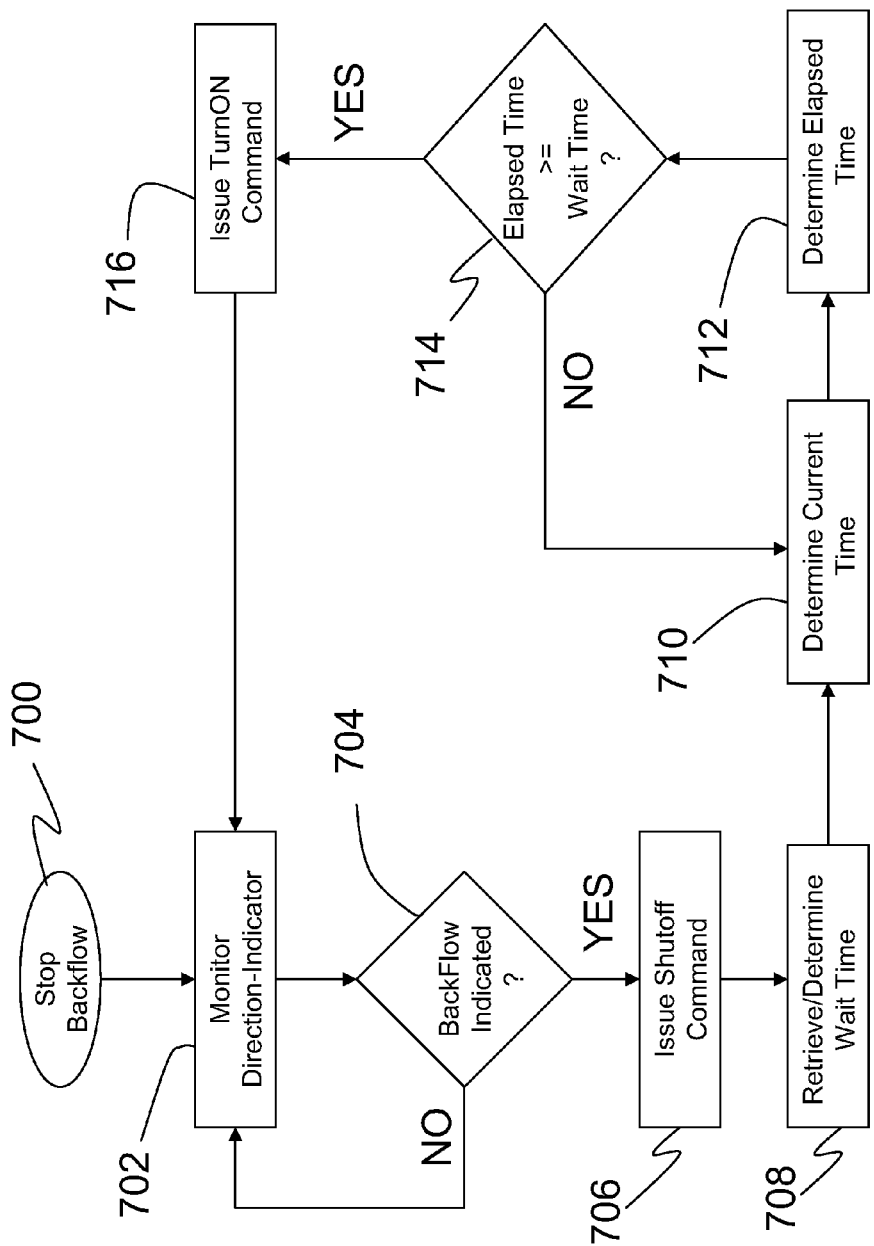
FIG. 18 is a flow chart representation of a Stop Backflow routine.

Referring now to FIG. 18, a block diagram of stop backflow routine (700) is presented. The stop backflow routine (700) is used in systems comprising a flow control element comprising an electronic shutoff and a direction-indicator disposed between the input and output of a water meter box as previously described. The first step in the process is to monitor the direction-indicator (702). If at step (704) it is determined that the direction-indicator does not indicate back flow, the process returns to step (702). If, however, back flow is indicated, the next step is issue a shutoff command at step (706). The electronic shutoff valve closes in response to the shutoff command and the backflow is stopped.

The next step (708) is to retrieve/determine the wait time before issuing a turn on signal. This wait time may be indefinite (requiring manual resetting of the system) or some predefined time interval. At step (710) the current time is determined. Next, at step (712), the elapsed time is determined. The elapsed time is compared to the wait time at step (714). If the elapsed time is greater than or equal to the wait time, a turn on signal command is issued at step (716). Otherwise, steps 710, 712, and 714 are repeated until the elapsed time is greater than or equal to the wait time.

Figure 19:
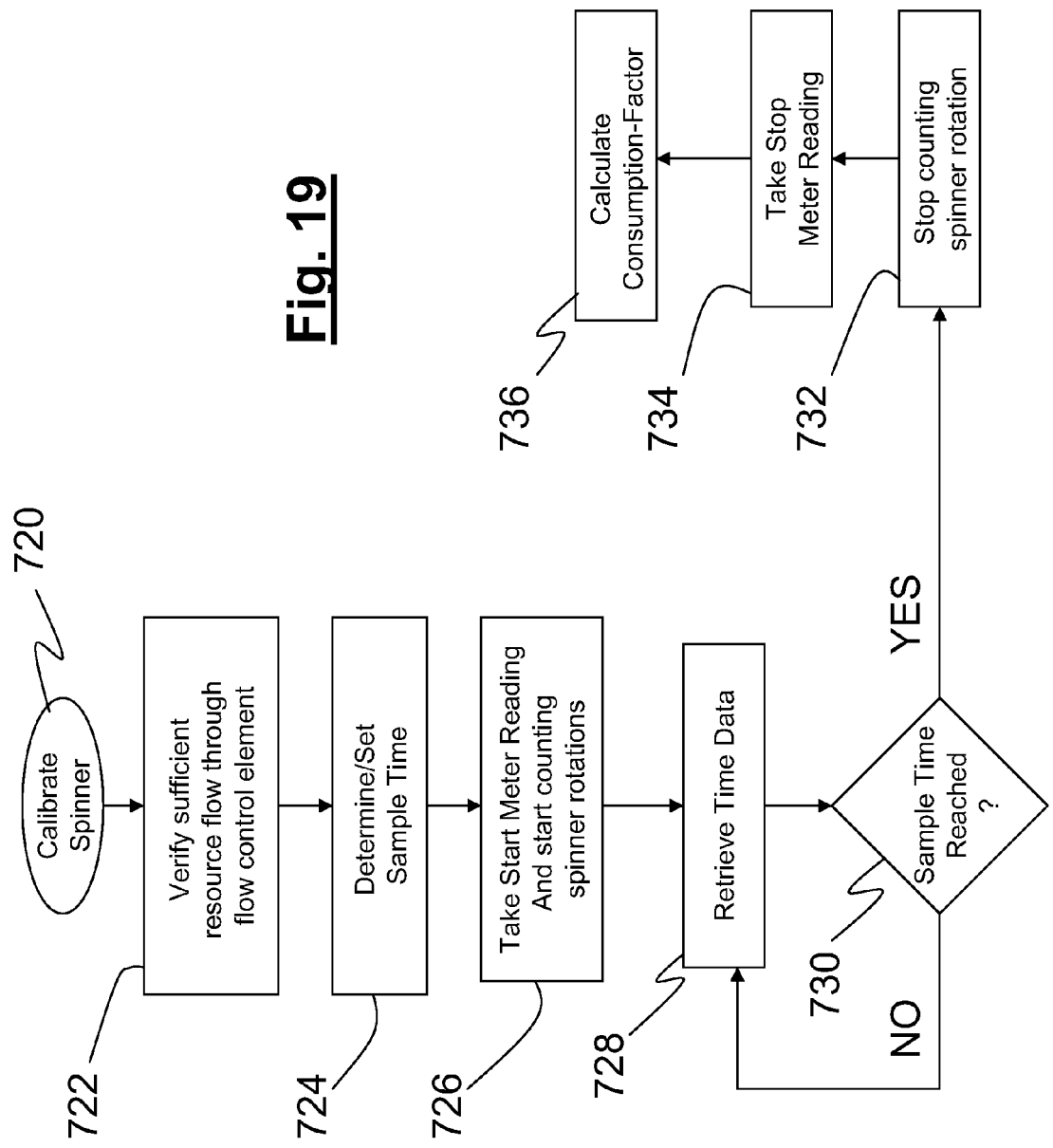
FIG. 19 is a flow chart representation of a Calibrate Spinner routine.

Attention is now directed to FIG. 19 which is a block diagram representation of a Calibrate Spinner Routine (720) for calibrating a spinner associated with a flow control element. It should be appreciated that as previously described, the flow control element controls the flow through a meter such as a water meter. A processing device is electrically associated with the flow control element and the water meter. The processing device is configured to count the spinner rotations and retrieve consumption data from the water mater.

The first step in the process is to verify sufficient resource flow through the flow control element for the purpose of calibration. If sufficient flow is verified at step (722), the next step (724) is to determine and set the sample time. The sample time is the length in time the calibration process will measure flow through the flow control element. At step (726) the processing device takes a start-meter-reading, begins counting the spinner rotations and takes a time reading (start time). At step (728) the processing device takes a time reading. Next, at step (730), the processing determines if the sample time has been reached. If the sample time has not been reached, steps (728) and (730) are repeated. When the sample time has been reached, the processing device stops counting spinner rotations and takes a stop-meter-reading. For flow control elements comprising an electronic shutoff, a shutoff signal may be sent to stop flow through the meter before advancing from step (730) to step (732).

Using such data, the processing device calculates a consumption-factor that is used to convert the spinner data into consumption data. For example, suppose the start-meter-reading was 10 units and the stop-meter-reading was 110 units. Also assume that spinner count was 500 spins. For such data, one possible consumption-factor could be (110 units–10 units) divided by 500 spins which equals 0.2 units/spin. Thus, if the spinner count is 10,000 spins, the resource consumption would calculated as (10,000 spins×0.2 units/spin) or 2,000 units.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A smart meter box comprising:
   a body comprising a wall structure defining a geometric shape of predefined height wherein the top of said wall structure is configured for being associated with a top cover, wherein the bottom of said wall structure defines the perimeter of the bottom of said body and wherein the inside of said body defines a cavity;
   a top cover movably associated with said body and configured for allowing access to said cavity;
   a first-fixture defining a first-fixture-input and an first-fixture-output wherein said first-fixture is configured to provide a fluid flow path from said first-fixture-input and through said first-fixture to said first-fixture-output, and wherein said first-fixture-input is configured for being associated with a utility service line and wherein said first-fixture is associated with said wall structure so that said first-fixture-input is disposed outside of said body and said first-fixture-output is disposed within said cavity thereby providing a fluid flow path from said first-fixture-input to said cavity;
   a second-fixture defining a second-fixture-input and a second-fixture-output, wherein said second-fixture-input is configured to provide a fluid flow path from said second-fixture-input and through said second-fixture to said second-fixture-output, and wherein said second-fixture-output is configured for being associated with a fluid consumer line and wherein said second-fixture is associated with said wall structure so that said second-fixture-input is disposed within said cavity and said second-fixture-output is disposed outside of said cavity thereby providing a fluid flow path from said cavity to said second-fixture-output;

an electronic module mechanically associated with one of (a) said wall structure, and (b) said top cover, said electronic module comprising a processing device electrically associated with a memory, a power source, and at least one data-transfer-facilitator, and wherein said memory is configured for storing warning-criteria, wherein each of said warning-criteria defines a warning-criteria condition;

at least two sensors electrically associated with said processing device, wherein said at least two sensors are configured for providing sensor-signals to said processing device and wherein at least one of said at least two sensors is selected from the group of sensors consisting of: (1) a temperature sensor; (2) a fluid level sensor; (3) a fluid pressure sensor; and (4) a light sensor;

wherein said processing device is further configure to monitor said sensor-signals and issue a warning when the processing device determines at least one of said sensor-signals satisfies a warning-criteria condition;

wherein said processing device is further configured to receive a data signal from a remote electronic device, said data signal comprising warning-criteria-update-information and wherein said processing device is further configured to update said warning-criteria stored in said memory using at least part of said warning-criteria-update-information; and wherein the at least one data-transfer-facilitator comprises at least one of (a) transmitter configured for transmitting a data-signal to a remote receiver, (b) a communications interface configured for transferring data to an electronic device electrically associated with said communications interface, and (c) a receiver configured for receiving a data signal.

2. A smart meter box as in claim 1, further comprising an antenna element disposed within a portion of said wall structure starting at the approximate top of said wall structure and extending a predefined distance down said wall structure, said antenna element suitably configured for being capacitively coupled to said data-transfer-facilitator.

3. A smart meter box as in claim 1, wherein said body is appropriately sized to fit inside a second meter box, said second meter box having a meter-box-top receiver configured for receiving a top cover, wherein the top of said wall structure defines a top ring suitably sized to be received by said meter-box-top receiver so that said body can be inserted into said second meter box with said top ring being received by said meter-box-top receiver.

4. A smart meter box as in claim 3, wherein said wall structure defines a sliding telescopic arrangement to allow said predefined height of said body to be adjusted.

5. A smart meter box as in claim 1, further comprising a chlorine sensor electrically associated with said processing device, said chlorine sensor configured to generate a sensor signal indicative of the amount of chlorine detected in the vicinity of the chlorine sensor.

6. A smart meter box as in claim 1, further comprising a top open sensor electrically associated with said processing device said top open sensor configured for generating sensor-signals indicative of the opened/closed status of said top.

7. A smart meter box as in claim 1 further comprising a pH sensor electrically associated with said processing device and in fluid communication with said flow path, said pH sensor configured for generating sensor-signals indicative of the pH level of a fluid in said path.

8. A smart meter box as in claim 1, further comprising a box-warmer section electrically associated with said processing device, said box-warmer section configured to generated heat upon receiving an activation control signal from said processing device.

9. A smart meter box as in claim 1, further comprising an electronic shutoff valve electrically associated with said processing device and mechanically associated with said first-fixture-output, said electronic shutoff valve configured to open and allow fluid flow through said first-fixture upon receiving an open-signal from said processing device and close and prevent fluid flow through said first-fixture upon receiving a close-signal from said processing device;

wherein said at least two sensors include a fluid pressure sensor configured to generate pressure-data, said fluid pressure sensor electrically associated with said processing device;

wherein said processing device is further configured to automatically generate said open-signal based at least in part on said pressure-data and said warning-criteria; and wherein said processing device is further configured to automatically generate said close-signal based at least in part on said pressure-data and said warning-criteria.

10. A smart meter box as in claim 1, further comprising an electronic shutoff valve electrically associated with said processing device and mechanically associated with said first-fixture-output, said electronic shutoff valve configured to open and allow fluid flow through said first-fixture upon receiving an open-signal from said processing device and close and prevent fluid flow through said first-fixture upon receiving a close-signal from said processing device and wherein said processing device is further configured to generate said close-signal based at least in part on an radio frequency signal received from a remote transmitter.

11. A smart meter box as in claim 10, wherein said electronic shutoff valve provides a backflow prevention function.

12. A flow control component as in claim 1, wherein said first-fixture-output defines a quick connector and wherein said second-fixture-input defines a quick connector.

13. A smart meter box as in claim 1, further comprising at least one imaging element disposed within said cavity and electrically associated with said processing device, said imaging element configured for acquiring images of at least one of (a) the smart meter box components and (b) the smart meter box environment.

14. A smart meter box as in claim 1, further comprising an electronic lock electrically associated with said power source and said processing device, wherein said electronic lock has a locked state where the electronic lock mechanically associates said body with said top cover and wherein said electronic lock has an unlocked state where the electronic lock does not mechanically associate said body with said top cover, and wherein the locked and unlocked status of the electronic lock is controlled by signals generated by said processing device.

15. A smart meter box as in claim 1, further comprising a remote module configured for being positioned at a remote location from said smart meter box, said remote module further configured for communicating with said electronic module to provide remote functions including at least one of (a) turning off the flow of fluid, (b) displaying selected smart meter box data, and (c) paying a bill.

16. A smart meter box as in claim 15, wherein said remote module comprises a biosensor configured to provide secured access to the remote module functions.

* * * * *